(12) United States Patent
Kawamura et al.

(10) Patent No.: US 9,083,870 B2
(45) Date of Patent: Jul. 14, 2015

(54) DRIVE DEVICE, IMAGE ACQUISITION DEVICE, AND ELECTRONIC APPARATUS

(75) Inventors: Hitoshi Kawamura, Ibaraki (JP); Manabu Tani, Ibaraki (JP); Takashi Hasuda, Ibaraki (JP); Ikuo Shinta, Ibaraki (JP); Susumu Aoki, Ibaraki (JP); Keisuke Taguchi, Ibaraki (JP)

(73) Assignee: Hitachi Maxell, LTD., Osaka (JP)

( * ) Notice: Subject to any disclaimer, the term of this patent is extended or adjusted under 35 U.S.C. 154(b) by 542 days.

(21) Appl. No.: 13/055,571

(22) PCT Filed: Jul. 22, 2009

(86) PCT No.: PCT/JP2009/003427
§ 371 (c)(1),
(2), (4) Date: Jun. 15, 2011

(87) PCT Pub. No.: WO2010/010692
PCT Pub. Date: Jan. 28, 2010

(65) Prior Publication Data
US 2011/0242403 A1    Oct. 6, 2011

(30) Foreign Application Priority Data

Jul. 25, 2008  (JP) .................................. 2008-192443
Jan. 27, 2009  (JP) .................................. 2009-015045
Apr. 1, 2009   (JP) .................................. 2009-088809

(51) Int. Cl.
*H04N 5/225*   (2006.01)
*G02B 7/08*    (2006.01)
(Continued)

(52) U.S. Cl.
CPC ................ *H04N 5/2254* (2013.01); *G02B 7/08* (2013.01); *H02N 2/025* (2013.01); *H04N 1/00307* (2013.01); *H04N 5/2257* (2013.01)

(58) Field of Classification Search
CPC ............ H04N 1/00307; H04N 5/2254; H04N 5/2257; H02N 2/025; G02B 7/08
USPC ......................................................... 348/360
See application file for complete search history.

(56) References Cited

U.S. PATENT DOCUMENTS 5,101,278 A * 3/1992 Itsumi et al. ................. 348/357
5,225,941 A * 7/1993 Saito et al. ................... 359/824
(Continued)

FOREIGN PATENT DOCUMENTS

JP    A-09-161665    6/1997
JP    B2-2625567     7/1997
(Continued)

OTHER PUBLICATIONS

International Search. Report dated Oct. 20, 2009 in corresponding International Application No. PCT/JP2009/003427 (with translation).
(Continued)

*Primary Examiner* — Aung S Moe
*Assistant Examiner* — Amy Hsu
(74) *Attorney, Agent, or Firm* — Oliff PLC

(57) ABSTRACT

A drive device in which the frequency of a drive waveform applied to a piezoelectric element is easily settable with less obligation to consider resonance in a stationary member. The device includes a piezo element that expands and contracts according to a drive voltage, a transmission shaft that receives vibration produced by the piezo element, a stationary member that holds the transmission shaft in a slidable state along the longitudinal direction of the transmission shaft, and a lens holder that is displaced together with the piezo element and transmission shaft relative to the stationary member according to drive of the piezo element. The piezo element and the transmission shaft move in the moving direction of the lens holder in synchronization with the lens holder according to drive of the piezo element in the state where the piezo element is spaced from the stationary member. By employing this structure, the frequency of the drive waveform applied to the piezo element can be set easily without considering resonance in the stationary member.

20 Claims, 19 Drawing Sheets

(51) Int. Cl.
*H02N 2/02* (2006.01)
*H04N 1/00* (2006.01)

(56) References Cited

U.S. PATENT DOCUMENTS

| | | | | |
|---|---|---|---|---|
| 5,589,723 | A * | 12/1996 | Yoshida et al. | 310/328 |
| 5,834,885 | A | 11/1998 | Itoh et al. | |
| 7,125,378 | B2 * | 10/2006 | Shimizu et al. | 600/112 |
| 7,154,210 | B2 * | 12/2006 | Hoshino | 310/317 |
| 7,199,506 | B2 * | 4/2007 | Sasaki et al. | 310/328 |
| 7,446,949 | B2 * | 11/2008 | Manabe et al. | 359/696 |
| 7,457,060 | B2 * | 11/2008 | Paik et al. | 359/824 |
| 7,595,947 | B2 * | 9/2009 | Lee et al. | 359/824 |
| 7,602,104 | B2 * | 10/2009 | Sakamoto | 310/323.09 |
| 7,656,072 | B2 * | 2/2010 | Hata et al. | 310/328 |
| 7,697,832 | B2 * | 4/2010 | Yamamoto et al. | 396/133 |
| 7,945,147 | B2 * | 5/2011 | Takayama et al. | 396/17 |
| 2002/0030422 | A1 * | 3/2002 | Hata | 310/323.17 |
| 2005/0179804 | A1 * | 8/2005 | Nakano et al. | 348/335 |
| 2006/0061236 | A1 * | 3/2006 | Naka et al. | 310/328 |
| 2006/0138873 | A1 * | 6/2006 | Yasuda | 310/12 |
| 2006/0140609 | A1 * | 6/2006 | Chen | 396/85 |
| 2009/0021118 | A1 * | 1/2009 | Sasaki | 310/329 |
| 2011/0141340 | A1 * | 6/2011 | Yumiki et al. | 348/345 |

FOREIGN PATENT DOCUMENTS

| | | |
|---|---|---|
| JP | B2-3180557 | 6/2001 |
| JP | A-2002-95274 | 3/2002 |
| JP | A-2002-224998 | 8/2002 |
| JP | A-2006-91210 | 4/2006 |
| JP | A-2006-178490 | 7/2006 |
| JP | A-2007-74889 | 3/2007 |
| JP | A-2008-253107 | 10/2008 |
| JP | A-2009-27783 | 2/2009 |

OTHER PUBLICATIONS

Notice of Reason for Rejection dated Nov. 24, 2010 in corresponding Japanese Application No. 2009-015045 (with translation).

* cited by examiner

DRIVE DEVICE, IMAGE ACQUISITION DEVICE, AND ELECTRONIC APPARATUS

TECHNICAL FIELD

The present invention relates to a drive device, an image acquisition device, and an electronic apparatus.

BACKGROUND ART

Imaging devices such as cameras are embedded into a wide variety of products today. When a camera is mounted on a small-sized electronic apparatus such as a cellular phone or a notebook computer, downsizing of the camera itself is strongly demanded.

An autofocus lens is incorporated into a camera in some cases. In such a case, downsizing of an actuator that displaces the lens is strongly demanded. As a small-sized actuator, an actuator that displaces a movable object by driving an piezoelectric element is known (cf. Patent document 1). In the actuator, vibration produced upon application of a voltage waveform to a piezoelectric element is transmitted, through a shaft coupled to the piezoelectric element, to a lens barrel slidably engaged with the shaft. By setting an appropriate waveform of the voltage waveform applied to the piezoelectric element, the speed of expansion and the speed of contraction of the piezoelectric element are differentiated. By the friction between the lens barrel and the shaft and the inertia of the lens barrel, the lens barrel undergoes or does not undergo displacement depending on the expansion and contraction state of the piezoelectric element.

For example, when the piezoelectric element expands in a short time, the lens barrel is not substantially displaced. When the piezoelectric element expands in a relatively long time, the lens barrel is displaced. On the contrary, when the piezoelectric element contracts in a short time, the lens barrel is not substantially displaced. When the piezoelectric element contracts in a relatively long time, the lens barrel is displaced.

By continuously applying a given voltage waveform (e.g. a sawtooth-shaped voltage waveform) to the piezoelectric element, the lens barrel can be moved in a desired direction on the shaft with which the lens barrel is engaged.

Patent document 1 discloses a structure in which a piezoelectric element and a drive shaft coupled to the piezoelectric element are supported by a special frame. Patent document 2 discloses a structure in which a drive device is produced with inclusion of a spindle. Patent document 3 discloses a drive device of the similar structure. Patent document 4 discloses a drive device in which a piezo element is urged by a leaf spring so that the piezo element and a shaft member are engaged with each other (cf. FIG. 10 in Patent document 4).

CITATION LIST

Patent Literature

[Patent document 1] Japanese Unexamined Patent Application Publication No. 2006-91210
[Patent document 2] Japanese Patent No. 2625567
[Patent document 3] Japanese Unexamined Patent Application Publication No. 2002-95274
[Patent document 4] Japanese Unexamined Patent Application Publication No. 2006-178490

SUMMARY OF INVENTION

Technical Problem

Incidentally, in the case of displacing the lens by driving the above-described actuator for implementing the autofocus function or zoom function, it is typical to drive the piezoelectric element at a constant frequency.

When a camera module is configured by fastening a piezoelectric element coupled to a drive shaft to a stationary member, resonance occurs in the stationary member due to the coupling of the piezoelectric element to the stationary member. As a result that a plurality of resonance frequencies arise, a frequency range (resonance frequency range) in which the displacement of a movable object is difficult to be controlled is generated. Note that the resonance frequency range depends on the shape and weight of the stationary member and the bonding state between the piezoelectric element and the stationary member and differs for each product into which the drive device is incorporated. If a given drive frequency is within the resonance frequency range, there is a possibility that accurate control of the actuator is difficult. Stated differently, whether the actuator functions normally or not can be determined only after the actuator is incorporated into a product. Setting error of the drive frequency can cause a decrease in product yield.

Further, in the case of implementing the zoom function, it may be necessary in some cases to change the moving speed of the lens, which is a movable object, from a high speed to a low speed. The change of the moving speed is performed by changing the drive frequency of the piezoelectric element. Specifically, for high-speed movement, the piezoelectric element is driven at a high frequency. For low-speed movement, the piezoelectric element is driven at a low frequency. In order to implement the zoom function, because a frequency band to be used is wide, a possibility that the use frequency band coincides with the above-described resonance frequency range increases more significantly. In such a case, there is a possibility that accurate control of the zoom mechanism is difficult.

The above problem can be improved to a certain degree by fixing the end of the drive shaft at which the piezoelectric element is not fastened to the stationary member, not fastening the piezoelectric element to the stationary member. However, this does not fundamentally solve the above problem.

As is obvious from the above description, it is strongly demanded to provide a drive device in which the frequency of the drive waveform applied to a piezoelectric element can be easily set with less obligation to consider resonance in a stationary member.

The present invention has been accomplished to solve the above problem and an object of the present invention is thus to provide a drive device capable of more easily setting the frequency of the drive waveform applied to a piezoelectric element with less obligation to consider resonance in a stationary member.

Solution to Problem

A drive device according to the present invention includes a piezoelectric element that expands and contracts according to a drive voltage, a drive shaft that receives vibration produced by the piezoelectric element, a stationary member that holds the drive shaft in a state where the drive shaft is slidable along a longitudinal direction of the drive shaft, and a movable object that is displaced together with the piezoelectric element and the drive shaft relative to the stationary member according to drive of the piezoelectric element, wherein the piezoelectric element and the drive shaft move in a moving direction of the movable object in synchronization with the movable object according to drive of the piezoelectric element in a state where the piezoelectric element is spaced from the stationary member.

It is preferred that the piezoelectric element and the drive shaft do not project more than the movable object in the moving direction side of the movable object.

It is preferred that the stationary member includes a shaft holding part that holds the drive shaft, and a main body part to which the shaft holding part is fixed.

It is preferred that the shaft holding part is detachable from the main body part.

It is preferred that the main body part is a surrounding member that surrounds the movable object.

It is preferred that the shaft holding part and the main body part are coupled to each other by structural engagement.

It is preferred that the shaft holding part and the main body part are formed integrally.

It is preferred that the movable object has at least one support part that fixedly supports the drive shaft.

It is preferred that the movable object has a plurality of support parts that fixedly support the drive shaft.

It is preferred that the shaft holding part is placed between the plurality of support parts.

It is preferred that a moving range of the movable object is restricted by abutting of the support part against the shaft holding part.

It is preferred that the drive shaft is made of material with a relative density of 2.1 or less. It is further preferred that the drive shaft is made of material with a relative density of 2.1 or less and an elastic modulus of 20 GPa or more. It is also preferred that the drive shaft is made of at least one material selected from a group of glass-like carbon, glass-like carbon complex at least containing graphite, fiber-reinforced resin containing carbon, and epoxy resin composite containing glass or carbon.

It is preferred that the piezoelectric element and the drive shaft are coupled to each other.

It is preferred that the movable object is a lens holder that holds a lens.

An image acquisition device according to the present invention includes the above-described drive device, and an image pickup unit that captures an image input through the lens.

An electronic apparatus according to the present invention includes the above-described image acquisition device.

A drive device according to the present invention includes a stationary member, a piezoelectric element, a drive shaft that receives vibration produced by the piezoelectric element, and a movable object that is fixed to at least one of the piezoelectric element and the drive shaft and displaced according to drive of the piezoelectric element, wherein the drive shaft is engaged with the stationary member in a state of being slidable along a longitudinal direction of the drive shaft, the piezoelectric element and the drive shaft are displaced relative to the stationary member according to drive of the piezoelectric element, and the movable object is displaced together with the piezoelectric element and the drive shaft relative to the stationary member.

Advantageous Effects of Invention

According to the present invention, it is possible to provide a drive device capable of reducing the obligation to consider resonance in a stationary member and more easily setting the frequency of the drive waveform applied to a piezoelectric element.

DESCRIPTION OF EMBODIMENTS

Embodiments of the present invention are described hereinafter with reference to the drawings. Each embodiment is simplified for convenience of description. The drawings are given in simplified form by way of illustration only, and thus are not to be considered as limiting the present invention. The drawings are given merely for the purpose of explanation of technological matters, and they do not show the accurate scale or the like of each element shown therein. The same elements are denoted by the same reference symbols, and the redundant explanation is omitted. The terms indicating the directions, such as up, down, left and right, are used on condition that each drawing is viewed from the front.

First Embodiment

A first embodiment of the present invention is described hereinafter with reference to FIGS. 1 to 18.

Figure 1:
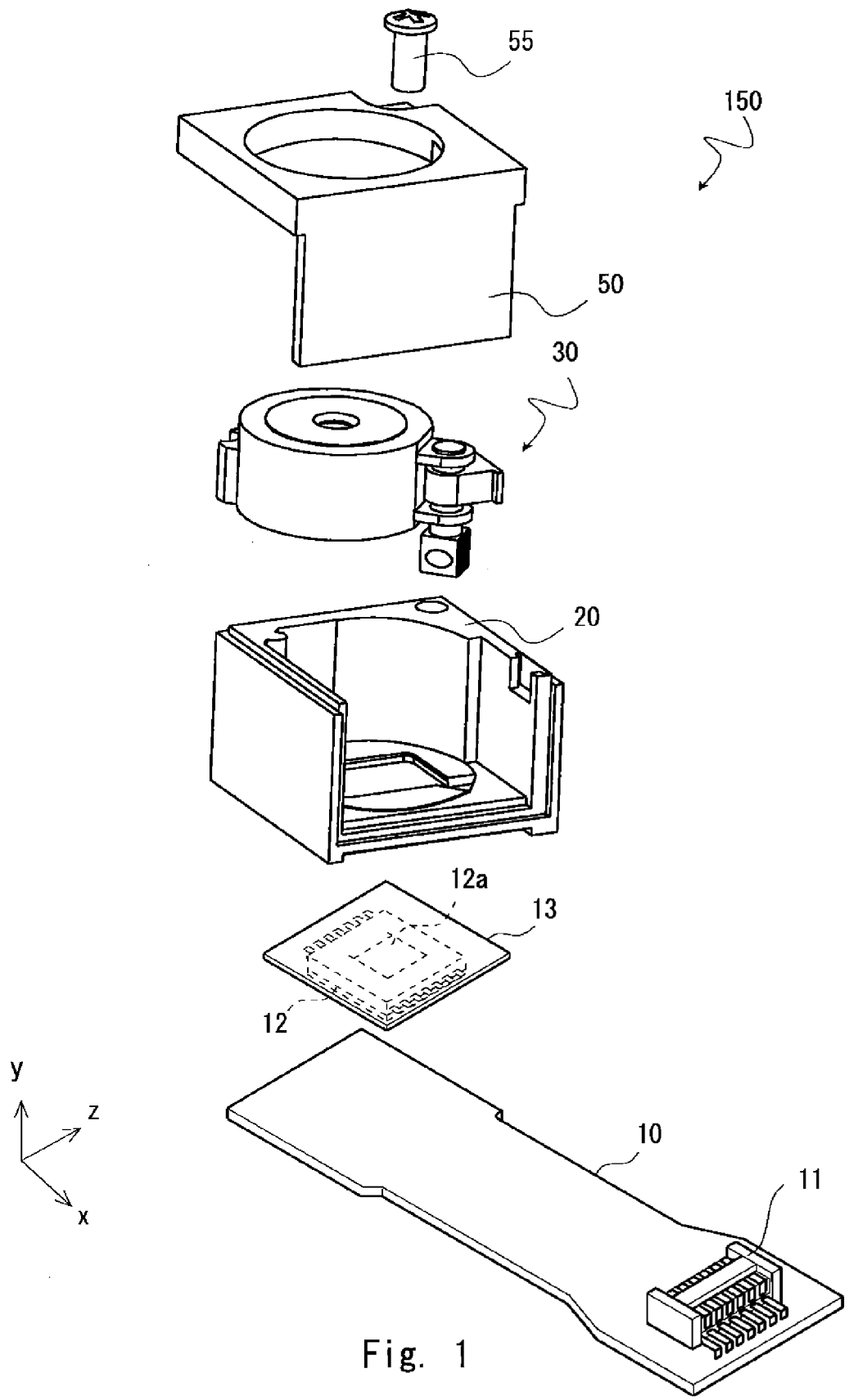
FIG. 1 is a schematic exploded perspective view of a camera module according to a first embodiment of the present invention.
Figure 2:
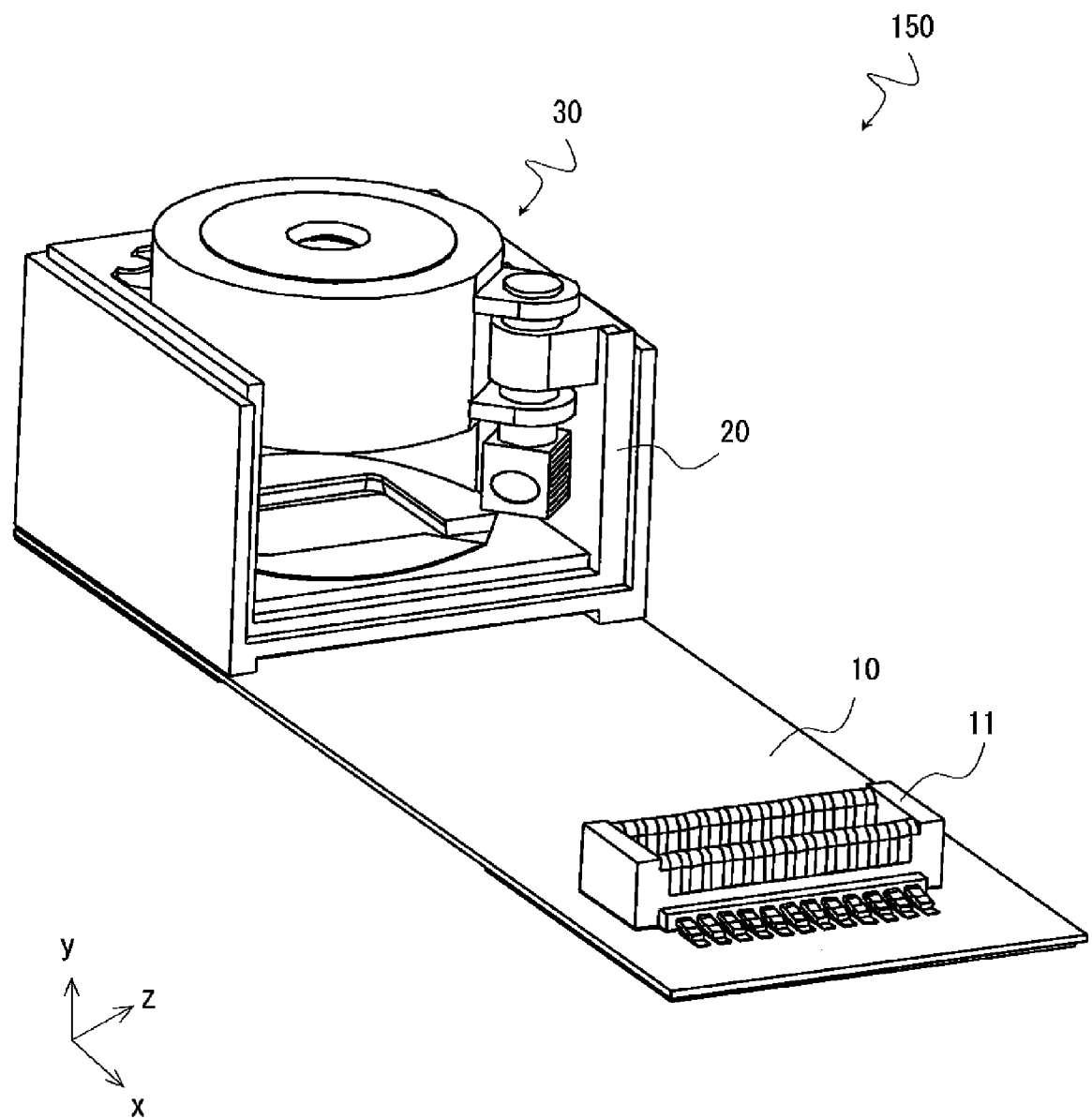
FIG. 2 is a schematic partial perspective view of the camera module according to the first embodiment of the present invention.
Figure 3:
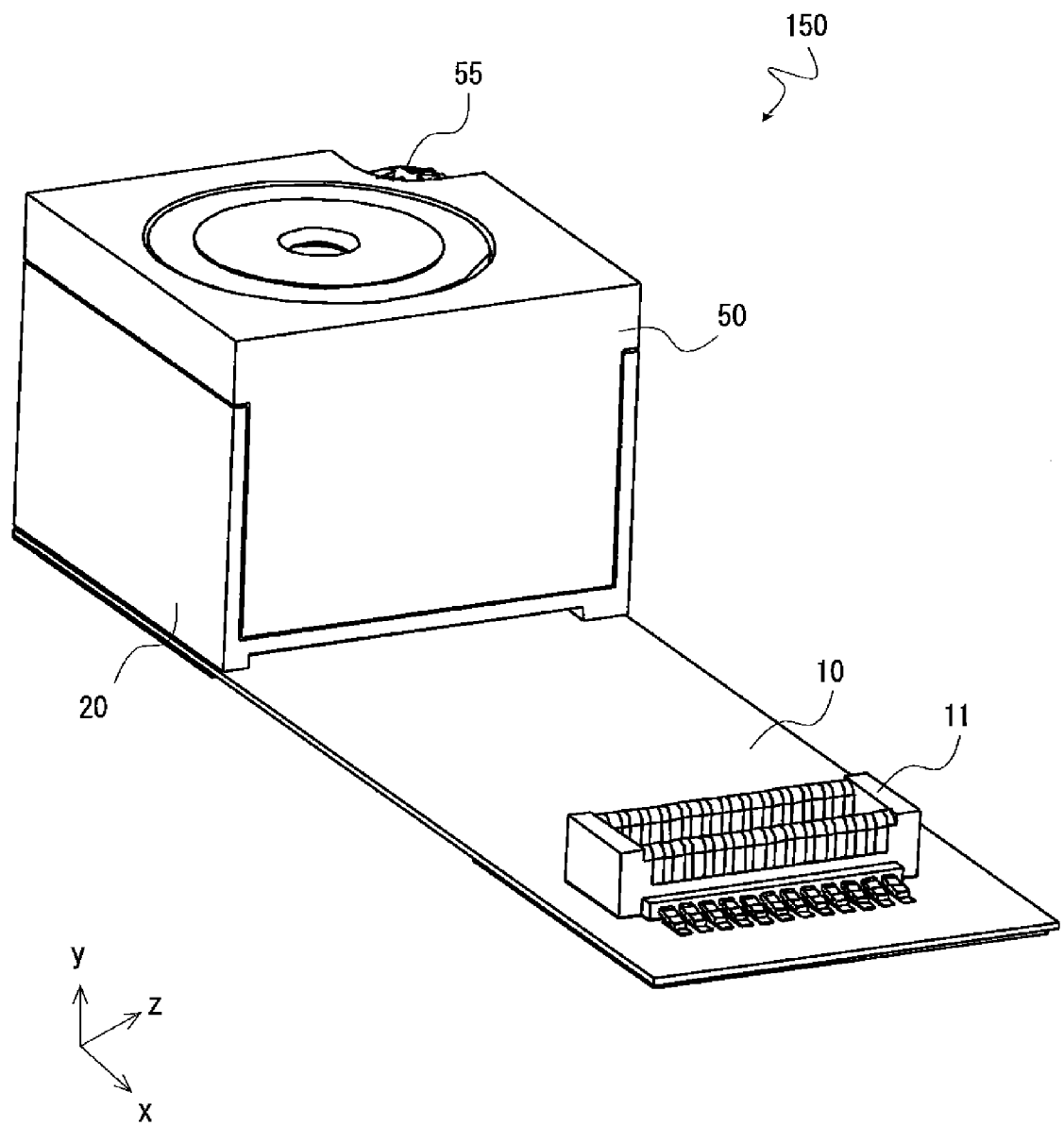
FIG. 3 is a schematic perspective view of the camera module in a finished state according to the first embodiment of the present invention.

As shown in FIGS. 1 to 3, a camera module (image acquisition device) 150 includes a flexible wiring board 10, a connector 11, an image sensor (imaging unit, imaging means) 12, a transparent substrate 13, a casing (main body part, surrounding member) 20, a lens unit (lens part) 30, a cover 50, and a screw 55.

The connector 11 is disposed on one end of the flexible wiring board 10. The image sensor 12 attached onto the transparent substrate 1313 is disposed on the other end of the flexible wiring board 10. Above the image sensor 12, the square transparent substrate 13, the case 20, the lens unit 30, the cover 50 and the screw 55 are arranged in this order. Note that the lower end surface of the case 20 is fixed to the flexible wiring board 10 by a black adhesive. This prevents extraneous light from entering the inside of the case 20. Note that the case 20 functions as a stationary member in the state of not moving (in the state of being fixed) when viewed from a moving object.

For convenience of description, structures of the case 20, the lens unit 30 and the cover 50 are described beforehand with reference to FIGS. 4 to 6.

Figure 4:
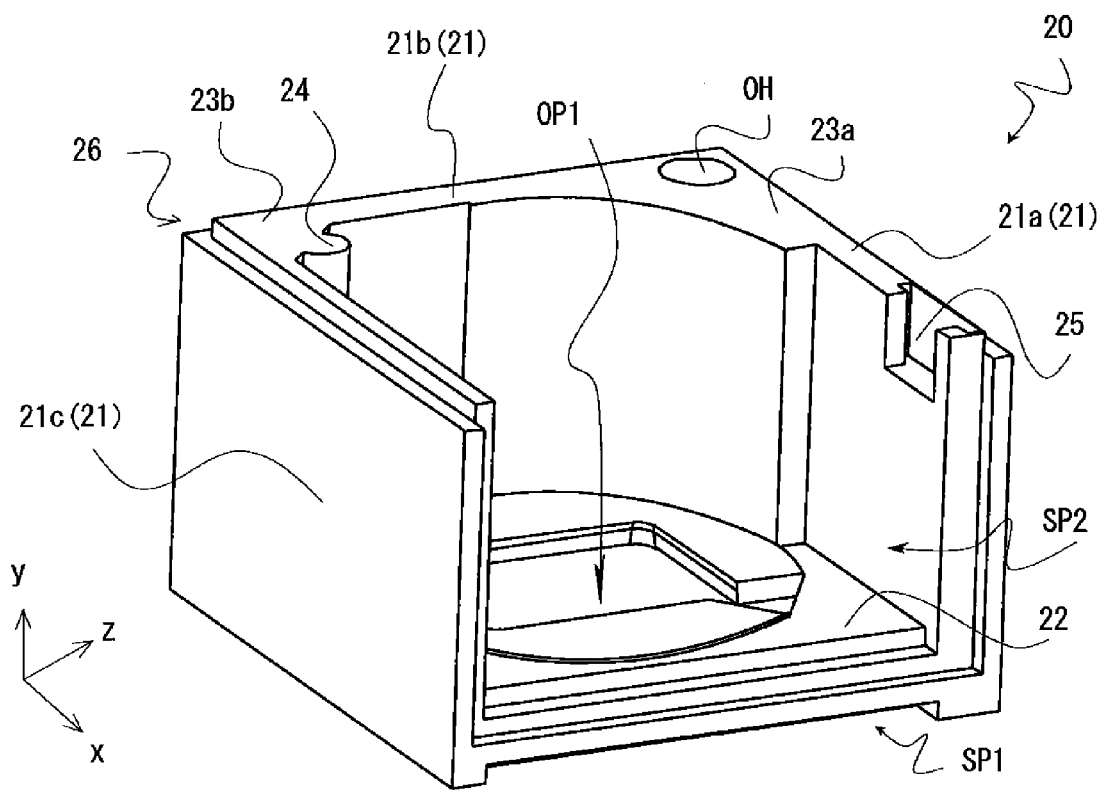
FIG. 4 is a schematic perspective view of a casing according to the first embodiment of the present invention.

As shown in FIG. 4, the case 20 has side portions 21a, 21b and 21c and a partition 22 and has a rectangular solid shape lacking a top face and one of the four side faces. By the partition 22, a lower space SP1 for housing the image sensor 12 and an upper space SP2 for housing the lens unit 30 are created in the case 20.

The partition 22 has an opening OP1 for an image input through a lens held by the lens unit 30 to be formed on an imaging surface of the image sensor 12. By the opening OP1, the lower space SP1 and the upper space SP2 are optically contactable. The opening OP1 can be an opening in an optical sense, and it is not necessarily a physically created hole.

A channel 26 for positioning the cover 50 is cut at the upper ends of the side portions 21a, 21b and 21c. A boundary 23a between the side portion 21a and the side portion 21b has a screw hole OH into which the screw 55 is screwed. A boundary 23b between the side portion 21b and the side portion 21c has a rail 24. A receiving portion 25 is made at the upper end of the inner surface of the side portion 21a. Note that the rail 24 extends along the y-axis and functions as a guide part for guiding the movement of a lens holder 31.

Figure 5:
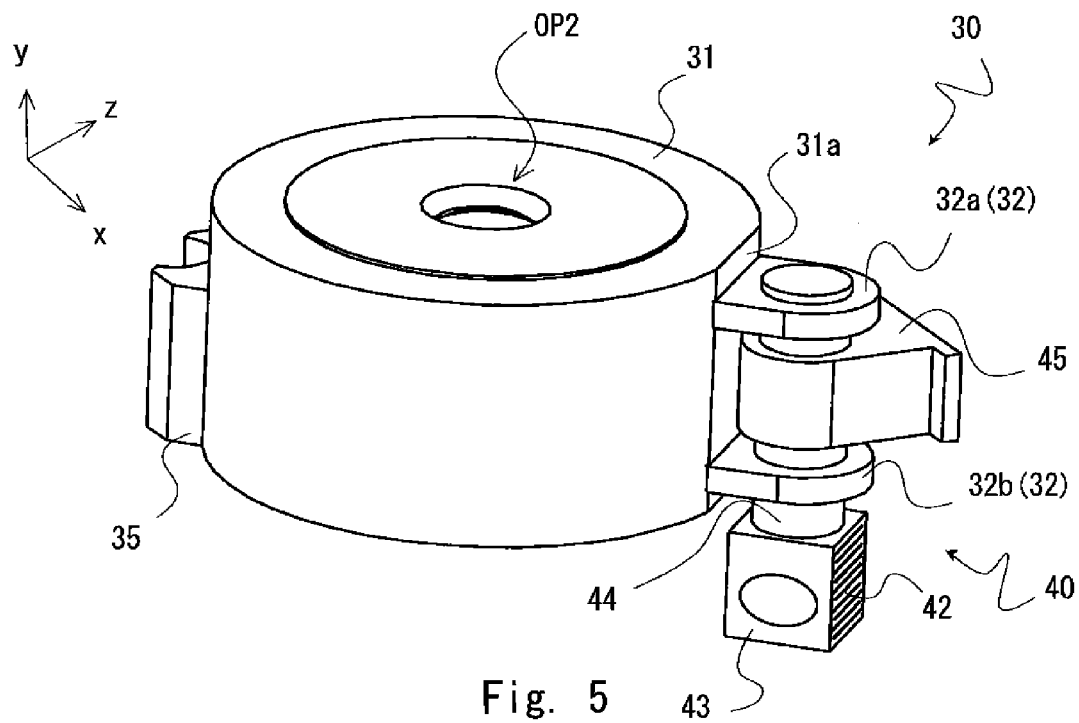
FIG. 5 is a schematic perspective view of a lens unit according to the first embodiment of the present invention.

As shown in FIG. 5, the lens unit 30 is composed of lenses L1 to L4 (cf. FIG. 8), a lens holder (lens holding part) 31, a piezo element (piezoelectric element) 42, a transmission shaft (drive shaft) 44, and a shaft holding part (link member, engaging portion) 45. The lens holder 31 houses the lenses L1 to L4 inside. On the periphery of the lens holder 31, the transmission shaft 44 to which the piezo element 42 is fastened at one end and the shaft holding part 45 engaged with the transmission shaft 44 are disposed. On the peripheral surface of the lens holder 31, a support plate (support part) 32 and a rail receiving portion 35 are integrally formed. The support plate 32 is placed on a flat surface 31a made on the peripheral surface of the lens holder 31. The transmission shaft 44 is fit into a hole of the support plate 32, so that the transmission shaft 44 is fixed to the lens holder 31. Note that a drive device is made up, including the case 20, the lens holder 31, the piezo element 42, the transmission shaft 44 and the shaft holding part 45.

The piezo element 42 and the transmission shaft 44 are firmly fixed to each other. The transmission shaft 44 is fixed to the lens holder 31. The shaft holding part 45 holds the transmission shaft 44 in the state of being slidable along the y-axis. In other words, the shaft holding part 45 and the transmission shaft 44 are in friction engagement with each other. The lenses, the lens holder 31, the piezo element 42 and the transmission shaft 44 having the relative positional relationship fixed to one another can be regarded as movable objects which can move relative to the shaft holding part 45 and the case 20. On the other hand, the shaft holding part 45 and the case 20 can be regarded as stationary members.

Figure 6:
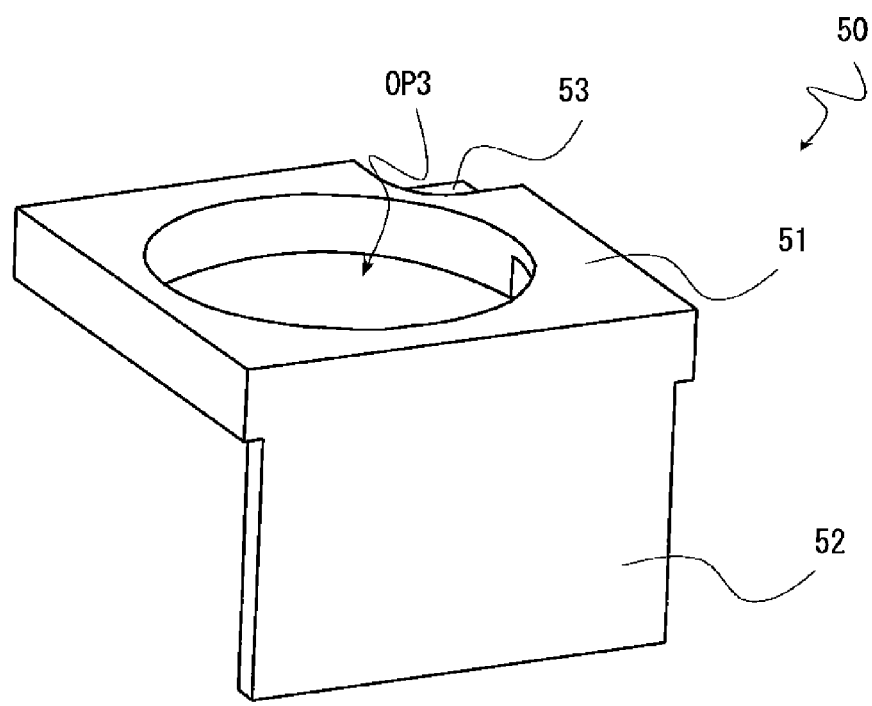
FIG. 6 is a schematic perspective view of a cover according to the first embodiment of the present invention.

As shown in FIG. 6, the cover 50 has a top plate 51 and a side plate 52 and it is an L-shaped member that closes the top face and one side face of the case 20. The top plate 51 has an opening OP3 that can partially house the front end of the lens holder 31. This enables displacement along the y-axis of the lens unit 30 with a suppressed increase in the thickness of the camera module 150. The top plate 51 also has a hole (not shown) into which the screw 55 is inserted. The top plate 51 is provided with a thin part 53 with a small thickness at a position corresponding to the placement position of the hole into which the screw 55 is inserted. This prevents the thickness of the camera module from increasing by the size of the head of the screw 55.

Referring back to FIGS. 1 to 3, further description will be presented. Reference is made also to FIGS. 4 to 6 as needed.

The flexible wiring board 10 is a sheet-like wiring board having flexibility. The flexible wiring board 10 functions as a transmission path of a control signal input to the image sensor 12 and a video signal output from the image sensor 12. Further, the flexible wiring board 10 functions as a transmission path of a voltage pulse input to the piezo element 42.

The connector 11 forms a connecting part for electrically and mechanically fixing the camera module 150 to a main apparatus.

The image sensor 12 is a general solid-state image pickup device such as a CCD (Charge Coupled Device) sensor or a CMOS (Complementary Metal Oxide Semiconductor) sensor. The image sensor 12 has a plurality of pixels arranged in matrix on an x-z plane. By photoelectric conversion in each pixel, an input image is converted into image data and output.

The transparent substrate 13 is a glass plate that is substantially transparent to input light. The image sensor 12 is mounted onto the backside (output surface) of the transparent substrate 13 via bumps. A light receiving surface 12a of the image sensor 12 is placed on the side of the transparent substrate 13. On the backside of the transparent substrate 13, a wiring pattern is formed beforehand. A plurality of solder bumps are disposed between the transparent substrate 13 and the image sensor 12. The wiring pattern and electrodes of the image sensor 12 are electrically connected by the solder bumps interposed therebetween. By the solder bumps provided at the positions of the electrodes of the image sensor 12, the image sensor 12 is fixed to the transparent substrate 13 and electrically connected to electrodes (pads) of the transparent substrate 13.

A distance (spaced distance) between the image sensor 12 and the transparent substrate 13 is determined by the size of the solder bumps. It is easy to control the size of the solder bumps. Therefore, the positioning between the image sensor 12 and the transparent substrate 13 can be made accurately by appropriately controlling the size of the solder bumps. Further, because the positioning is made by the plurality of solder bumps, the spaced distance between the image sensor 12 and the transparent substrate 13 is balanced.

Further, solder bumps are arranged between the transparent substrate 13 and the flexible wiring board 10. By the solder bumps, electrical connection between the transparent substrate 13 and the flexible wiring board 10 is secured. Note that a space is made between the image sensor 12 and the flexible wiring board 10. In other words, the solder bumps function as a spacer for creating a space between the image sensor 12 and the flexible wiring board 10.

The case 20 is disposed above the image sensor 12. The case 20 houses the image sensor 12 in the lower space SP1 and houses the lens unit 30 in the upper space SP2. A bottom surface part (base end surface) of the side wall of the case 20 that forms the lower space SP1 is fixed to the flexible wiring board 10 by a black adhesive. The use of the case 20 enables modularization of the camera function. Note that the case 20 is produced by molding of black resin, for example.

Figure 8:
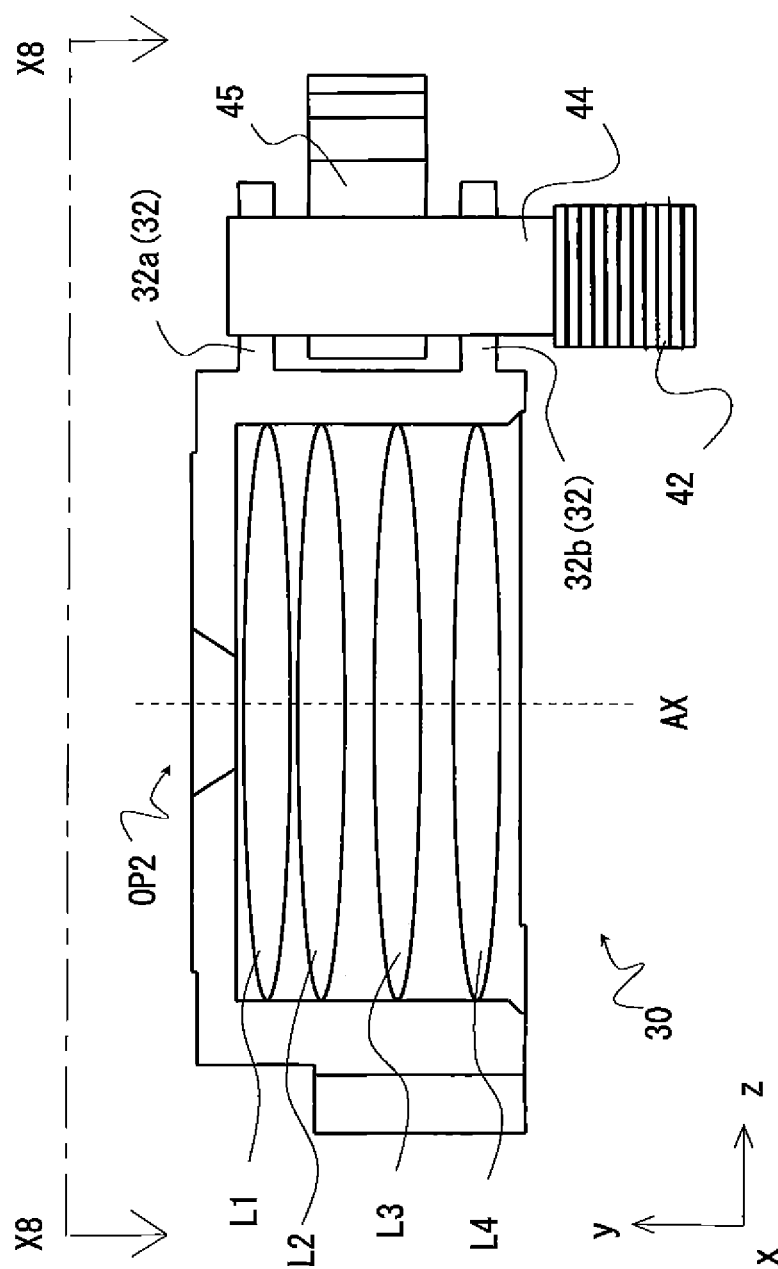
FIG. 8 is a view showing a schematic cross-sectional structure of the lens unit according to the first embodiment of the present invention.

The lens unit 30 holds the lenses L1 to L4 (cf. FIG. 8). The lens unit 30 is movable along the y-axis (the axis line coinciding with the optical axis of the lenses L1 to L4) (excluding the shaft holding part 45). By adjusting the placement height of the lenses L1 to L4 relative to the imaging surface of the image sensor 12, an object image can be appropriately formed on the imaging surface of the image sensor 12.

The cover 50 is attached to the case 20 to which the lens unit 30 is attached. The lens unit 30 disposed in the upper space SP2 of the case 20 can be thereby confined inside the case 20.

The cover 50 is attached to the case 20 by the screw 55. Because the cover 50 is fixed to the case 20 not by adhesion but by the screw 55, the cover 50 is detachable from the case 20. This allows the cause of defect of the camera module 150 determined to be defective by an operating test to be removed after the test. For example, by eliminating a foreign particle sticking on the imaging surface of the image sensor 12 after the operating test, the yield of the camera module can be improved. Note that the cover 50 is produced by molding of resin, for example.

Hereinafter, a structure of the lens unit 30 is specifically described with reference to FIGS. 7 and 8. FIG. 8 shows a schematic cross-sectional structure of the lens unit 30 along a virtual axis line shown in FIG. 7.

Figure 7:
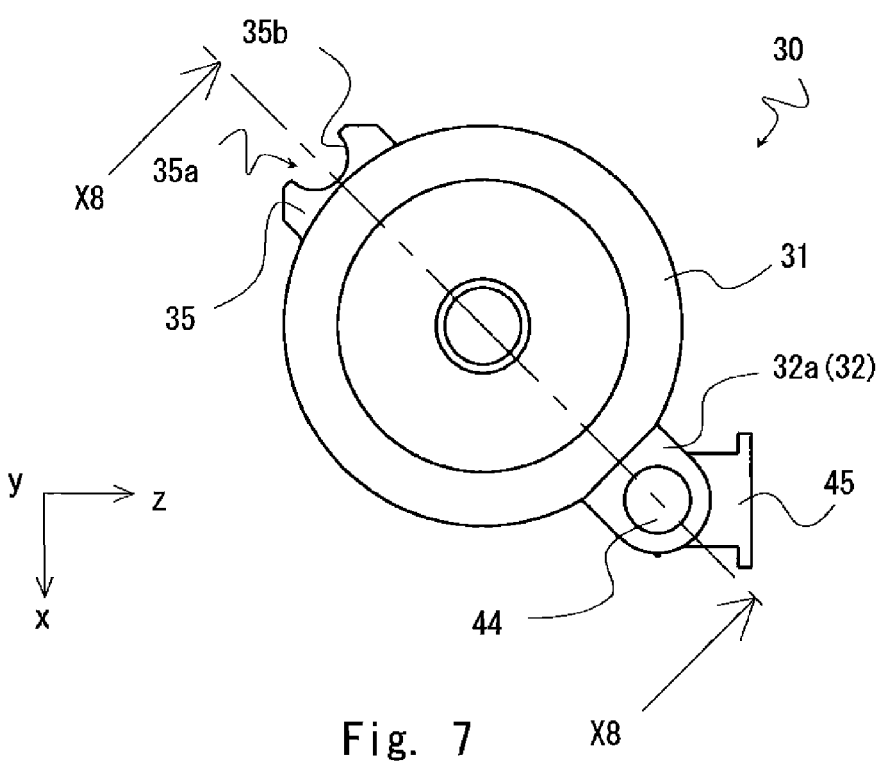
FIG. 7 is a schematic top view of the lens unit according to the first embodiment of the present invention.

As shown in FIG. 7, the support plate 32 and the rail receiving portion 35 are formed on the periphery of the lens holder 31.

By fixedly supporting the transmission shaft 44 by the support plates 32a and 32b with the shaft holding part 45 placed therebetween, the moving range of the shaft holding part 45 (the moving range of the lens holder 31) can be restricted. However, it is not limited to such two-point support, and one-point support that mechanically fixes the transmission shaft 44 to the support plate 32a only may be employed, and the upper limit of the moving range of the link portion 45 may be restricted.

The transmission shaft 44 is mechanically fixed to the support plate 32a. The hole of the support plate 32a is slightly narrower than the diameter of the transmission shaft 44. By fitting the transmission shaft 44 into the hole of the support plate 32a by applying a pressure, the transmission shaft 44 can be mechanically fixed to the support plate 32. Further, the transmission shaft 44 is mechanically fixed to the support plate 32b. The hole of the support plate 32b is slightly narrower than the diameter of the transmission shaft 44. By fitting the transmission shaft 44 into the hole of the support plate 32b by applying a pressure, the transmission shaft 44 can be mechanically fixed to the support plate 32. By tightly holding the transmission shaft 44 by the support plates 32a and 32b, a vibration transmission rate between the transmission shaft 44 and each of the support plates 32a and 32b increases. This enables efficient displacement of the lens holder 31.

The opening diameter of the support plate 32b may be made larger than the opening diameter of the support plate 32a, and the transmission shaft 44 and the support plate 32b may be bonded together by a silicone adhesive. The support plate 32b and the transmission shaft 44 can be thereby fixed resiliently. As another method, the opening diameter of the support plate 32b may be made slightly larger than the opening diameter of the support plate 32a, and the transmission shaft 44 may be press-fitted thereinto. Further, as another method, the support plate 32b and the transmission shaft 44 may be fixed to each other by an O ring therebetween.

The transmission shaft 44 may be tightly held by the support plate 32a, and the transmission shaft 44 may be loosely held by the support plate 32b. In this case, the vibration transmission rate between the transmission shaft 44 and the support plate 32a is high, and the vibration transmission rate between the transmission shaft 44 and the support plate 32b is low. Hereinafter, the former is referred to as strong fastening, and the latter is referred to as weak fastening.

In the case of employing a method different from the press fitting, the above-described weak fastening and strong fastening can be achieved by appropriately selecting adhesives. For example, it is preferred to use a thermosetting adhesive for achieving the strong fastening, and to use a silicone adhesive for making the weak fastening. In this case, the opening diameters of the support plates 32a and 32b may be set to the same size.

Note that, in the case of the strong fastening, when the strength of vibration produced by the piezo element 42 is 100%, vibration with 90% of that strength is received by the support plate 32a. In the case of the weak fastening, vibration with 70% of the strength of vibration produced by the piezo element 42 is received by the support plate 32b. In this example, a fastening method by which vibration with 80% or more of the strength of vibration produced by the piezo element 42 is defined as the strong fastening, and a fastening method by which vibration with less than 80% of the strength of vibration produced by the piezo element 42 is defined as the weak fastening.

The rail receiving portion 35 is a protrusion which projects outward and has a depression 35a coinciding with the shape of the rail 24. The surface of the rail 24 comes into contact with the surface 35b of the depression 35a. By the contact between the rail 24 and the rail receiving portion 35, friction occurs when the lens holder 31 is displaced along the y-axis. This enables stabilization of the movement of the lens holder 31.

As shown in FIG. 8, the lens holder 31 houses the lenses L1 to L4. The lenses L1 to L4 are press-fitted and positioned relative to the lens holder 31 with predetermined accuracy. Note that the lenses may be fixed to the lens holder 31 by a method different from the press-fitting. A top plate of the lens holder 31 has an opening OP2. The top plate of the lens holder 31 functions optically as a diaphragm.

The two support plates 32a and 32b arranged in the y-axis direction with a certain space therebetween are formed on the peripheral surface of the lens holder 31. The support plates 32a and 32b are plate-shaped parts that extend outside of the lens holder 31.

The shaft holding part 45 engaged with the transmission shaft 33 is disposed between the support plates 32a and 32b. The respective members of the support plates 32a and 32b and the shaft holding part 45 have holes through which the transmission shaft 33 is inserted. In the state where the shaft holding part 45 is placed between the support plates 32a and 32b, the transmission shaft 44 is inserted to those members. The lens holder 31 and the shaft holding part 45 are thereby coupled through the transmission shaft 44 as shown in FIG. 8.

The hole of the shaft holding part 45 substantially coincides with the diameter of the transmission shaft 44. The transmission shaft 44 is inserted into the hole of the shaft holding part 45, so that the shaft holding part 45 is engaged with the transmission shaft 44 so as to be slidable along the y-axis. Note that the shaft holding part 45 and the transmission shaft 44 are in contact state, and when the transmission shaft 44 is disposed relative to the shaft holding part 45, friction occurs between the shaft holding part 45 and the transmission shaft 44.

The piezo element 42 is a typical piezoelectric element in which ceramics layers (piezoelectric layers) are laminated. A pair of electrodes 43 (cf. FIG. 5) are formed on sides surfaces of the piezo element 42. When, in the state where one electrode 43 is grounded, a voltage pulse is applied to the other electrode 43, the piezo element 42 expands and contracts in the y-axis direction, for example.

The transmission shaft 44 is fixed to the upper face of the piezo element 42. Specifically, the transmission shaft 44 is fixed to the piezo element 42 by an adhesive in the state where the lower end face of the transmission shaft 44 is placed on the upper face of the piezo element 42. Note that the transmission shaft 44 may be fixed to the piezo element 42 in a method different from the adhesive. For example, an attachment that has the same sectional shape as the piezo element and has a depressed portion to which the transmission shaft can be fit at its upper part may be prepared above the piezo element 42, and the transmission shaft and the piezo element may be coupled with the attachment placed therebetween.

The transmission shaft 44 transmits vibration produced by the piezo element 42 to the shaft holding part 45. The shaft holding part 45 is mechanically fixed to the case 20. Accordingly, the transmission shaft 44 transmits the vibration produced by the piezo element 42 to the case 20 through the shaft holding part 45, and because the shaft holding part 45 is fixed to the case 20, the vibration produced by the piezo element 42 causes the piezo element 42 and the transmission shaft 44 fixed thereto and the lens holder 31 itself to move relative to the shaft holding part 45. The transmission shaft 44 is preferably lightweight and highly rigid. The transmission shaft 44 is produced by molding carbon, beryllium or the like, for example. Alternatively, it is verified experimentally that carbonaceous material such as glass-like carbon (amorphous carbon) and thermosetting epoxy resin material are most suitable as the material.

A method of attaching the lens unit 30 to the case 20 is described hereinafter with reference to FIG. 9.

Figure 9:
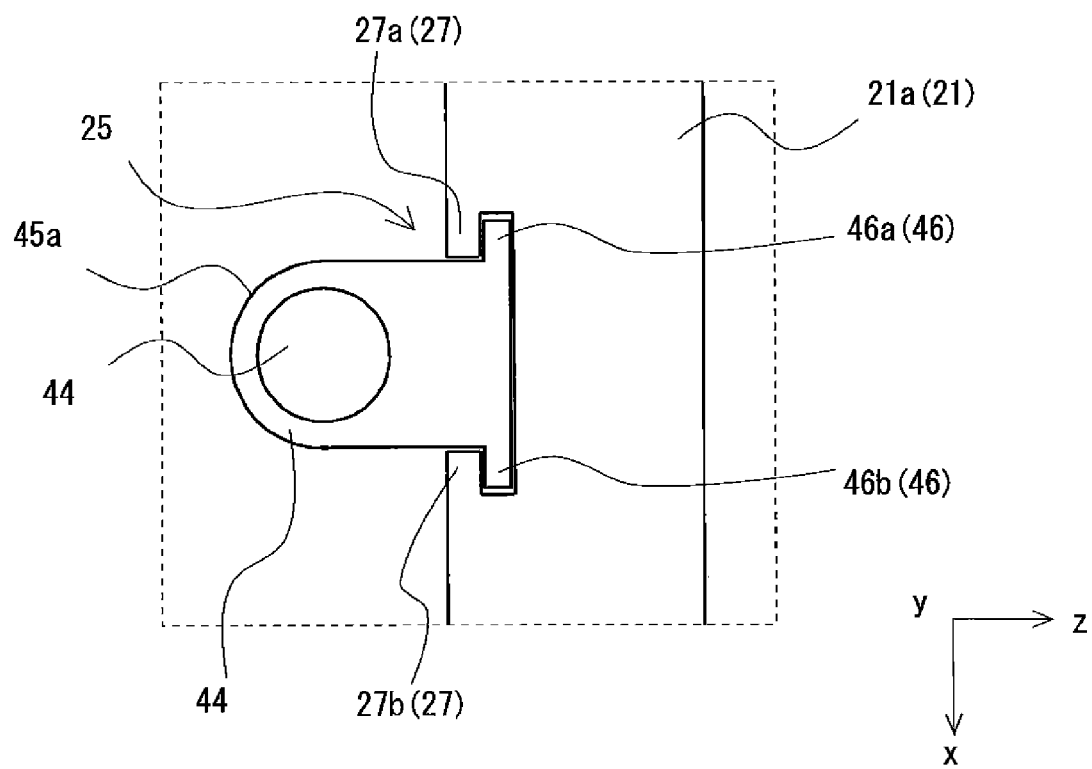
FIG. 9 is an illustrative view to illustrate a method of attaching the lens unit to the casing according to the first embodiment of the present invention.

As shown in FIG. 9, the shaft holding part 45 has a curved surface 45a that is formed by curved surface machining at the inner end. Further, the shaft holding part has flanges 46 (46a, 46b) formed on the outer end side. Note that the shaft holding part 45 is a metal part such as SUS, for example.

The case 20 has the receiving portion 25 as described above. The receiving portion 25 is made with a depressed portion on the inner wall of the case 20. The receiving portion 25 is open upward for allowing fitting of the shaft holding part 45.

As shown in FIG. 9, the shaft holding part 45 is mechanically fixed to the case 20, with the outer end part of the shaft holding part 45 fit into the receiving portion 25. In this example, the case 20 has protrusions 27 (27a, 27b) for restricting the placement position of the shaft holding part 45 fit into the receiving portion 25. Thus, by fitting 45 into the receiving portion 25, the inward movement of the flanges 46 is restricted by the protrusions 27, so that the shaft holding part 45 can be reliably positioned and fixed to the case 20. Note that it is preferred to fix the shaft holding part 45 to the case 20 by applying an adhesive after fitting the shaft holding part 45 into the receiving portion 25. Further, the link member 45 may be directly fastened to the inner all surface of the case 20 without providing the case 20 with the receiving portion 25. Note that by using a manufacturing method called insert molding, the shaft holding part 45 and the case 20 may be integrally formed. In this method, when molding the case 20 with a die after completing assembly of the lens unit 30, the link member 45 of the lens unit 30 is buried in a part of the die, thereby making integral molding. In this case, the accuracy of the position of the lens unit 30 relative to the case 20 can be enhanced compared to the above-described way of attachment by fitting.

Figure 10:
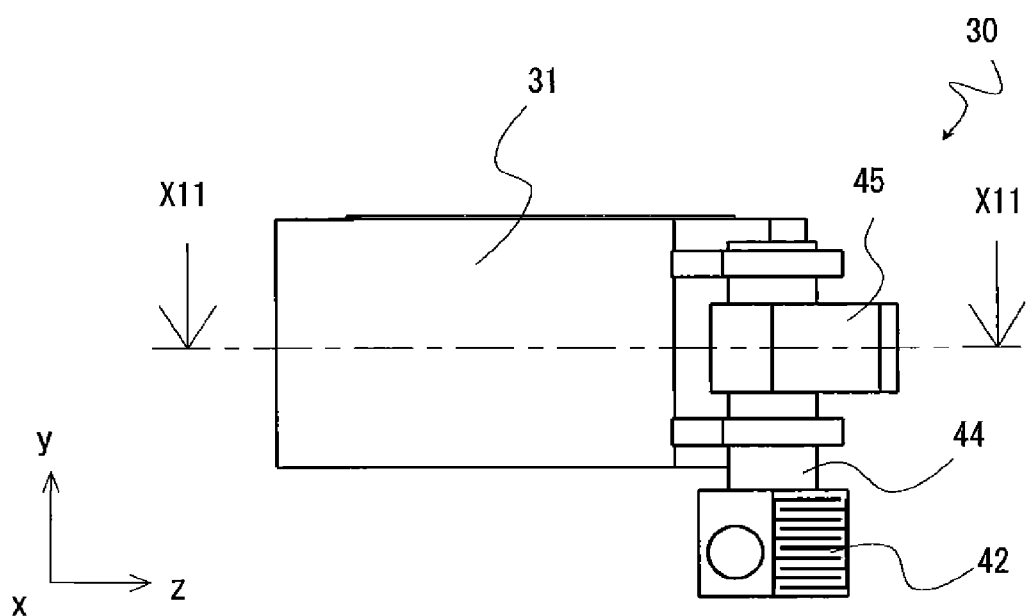
FIG. 10 is a side view of the lens unit according to the first embodiment of the present invention.

Hereinafter, the configuration of the lens unit 30 is further described with reference to FIGS. 10 and 11. Note that FIG. 11 is a schematic cross-sectional view along a virtual line in FIG. 10.

Figure 11:
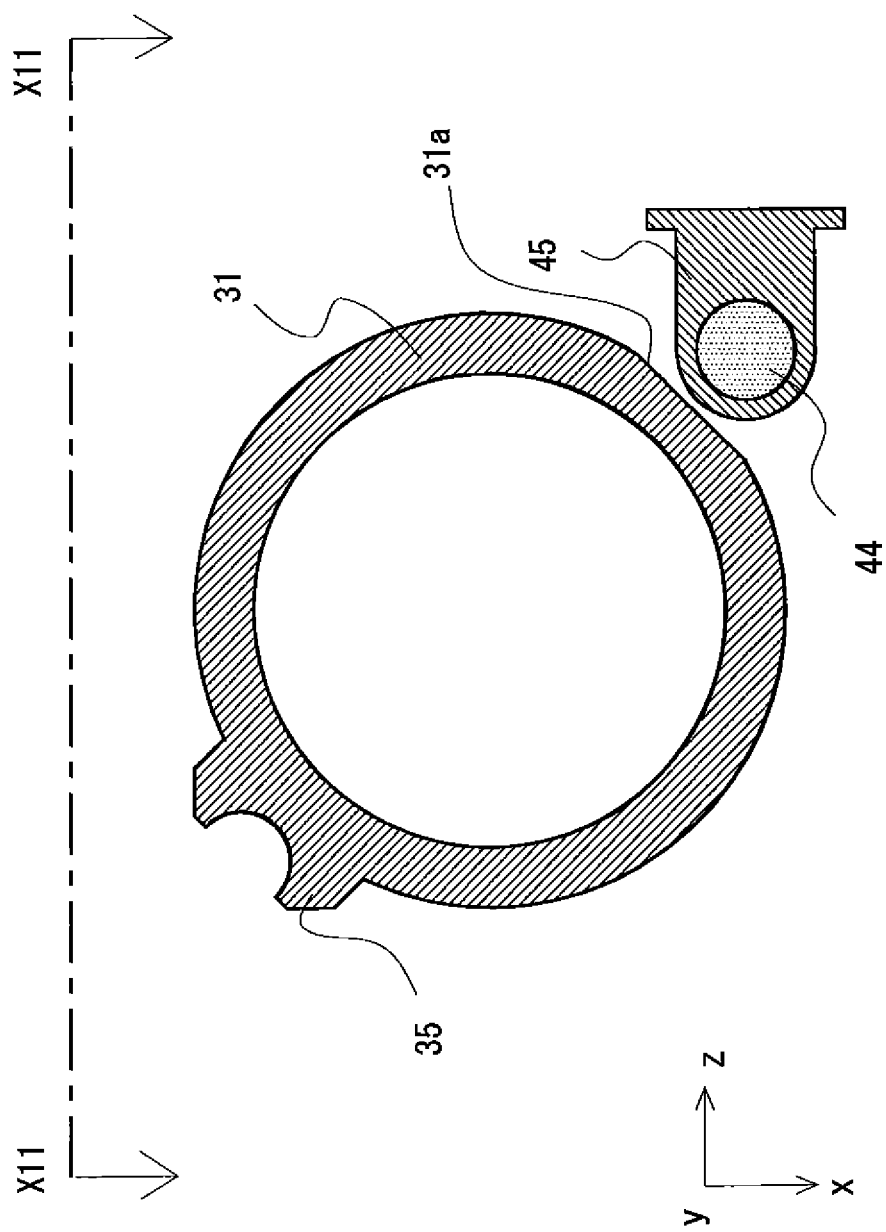
FIG. 11 is a view showing a schematic cross-sectional structure of the lens unit according to the first embodiment of the present invention.

As shown in FIG. 11, the lens holder 31 has the flat surface 31a. Further, the shaft holding part 45 has the curved surface 45a at its inner end. Because the flat surface 31a is made on the lens holder 31, the movement of the shaft holding part 45 in the x-z plane is permitted to thereby facilitate the assembly of the lens unit 30.

Figure 12:
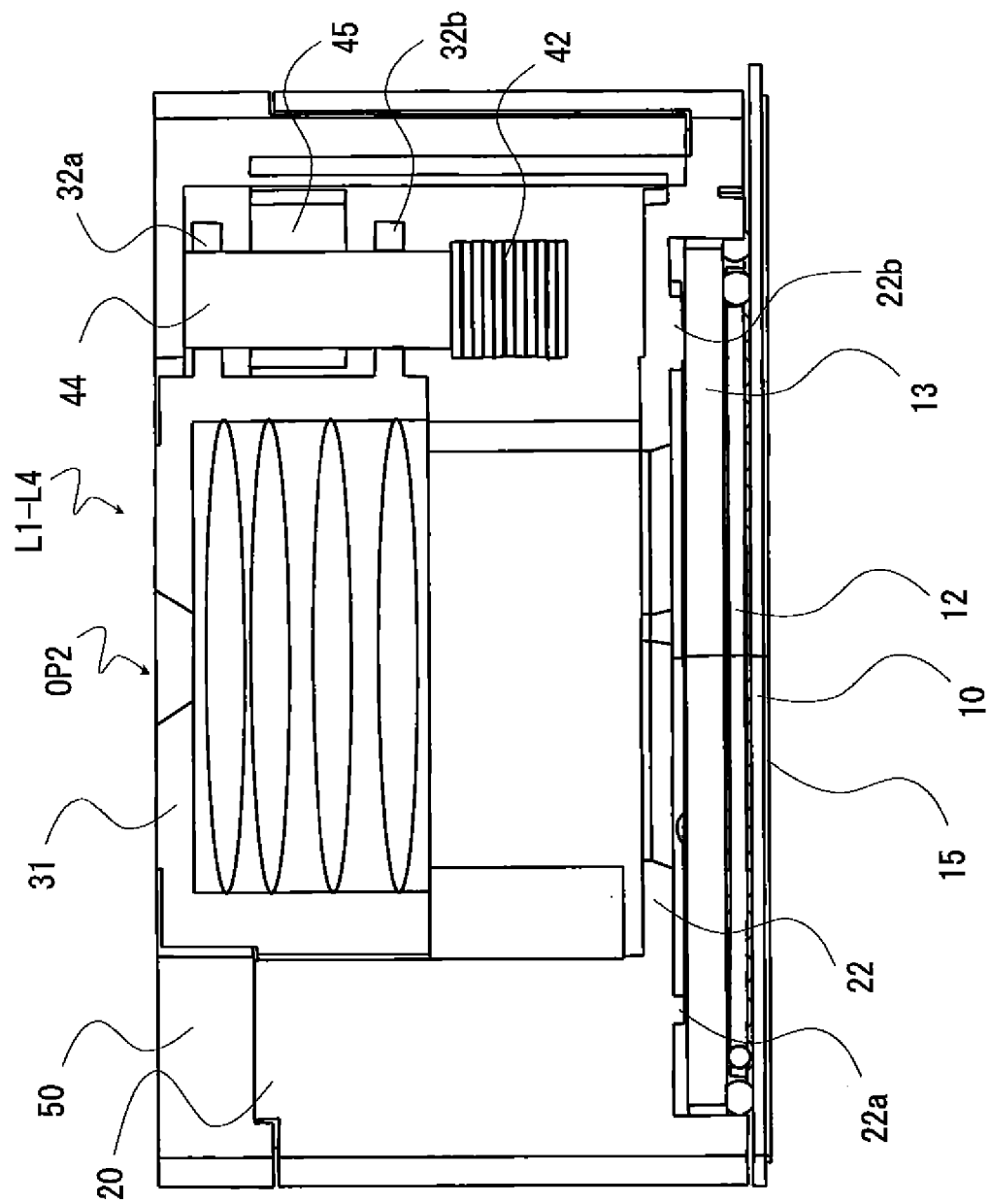
FIG. 12 is a view showing a schematic cross-sectional structure of the camera module according to the first embodiment of the present invention.

A schematic cross-sectional structure of the camera module 150 is described with reference to FIG. 12. As shown in FIG. 12, on the backside of the partition 22, ribs (position restriction portions) 22a and 22b are formed. By these, when placing the case 20 on the transparent substrate 13, it is possible to suitably hold down the transparent substrate 13 from the up direction and suitably position the transparent substrate 13. Note that the placement position of the transparent substrate 13 may be restricted from the up direction directly by the case 20, without forming the ribs 22a and 22b.

In order to suitably position the transparent substrate 13, ribs (not shown) opposed to the side face of the transparent substrate 13 may be formed on the case 20. By these, when placing the case 20 on the transparent substrate 13, it is possible to suitably restrict the placement position of the transparent substrate 13 from the cross direction and thereby suitably position the transparent substrate 13. Note that the placement position of the transparent substrate 13 may be restricted from the cross direction directly by the case 20, without forming such ribs.

Note that, as shown in FIG. 12, a reinforcing plate 15 is disposed below the flexible wiring board 10. The reinforcing plate 15 is made of resin material such as polyimide. The color of the reinforcing plate 15 is black. By placing the reinforcing plate 15, it is possible to suitably prevent extraneous light from entering the inside of the camera module 150. Further, in this example, the black flexible wiring board 10 is employed to further suppress the adverse effect of extraneous light.

Although not shown in FIG. 12, the image sensor 12 is connected to wiring formed on the transparent substrate 13 through bumps (solder bumps etc.). In FIG. 12, the illustration of the bumps is omitted.

An operation of the camera module 150 is described hereinafter with reference to FIGS. 13 to 16.

Figure 13:
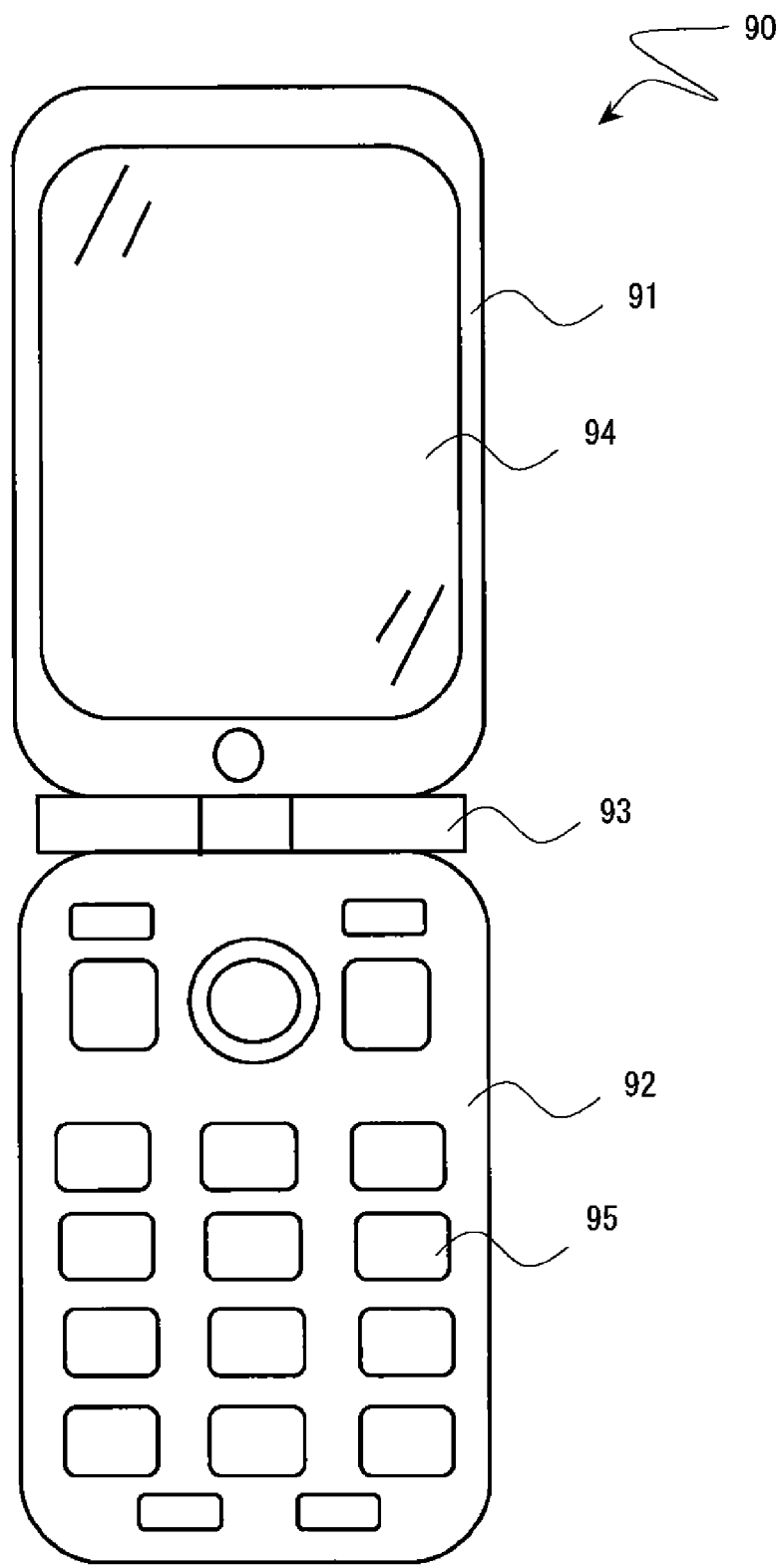
FIG. 13 is a schematic view showing a structure of a cellular phone according to the first embodiment of the present invention.
Figure 14:
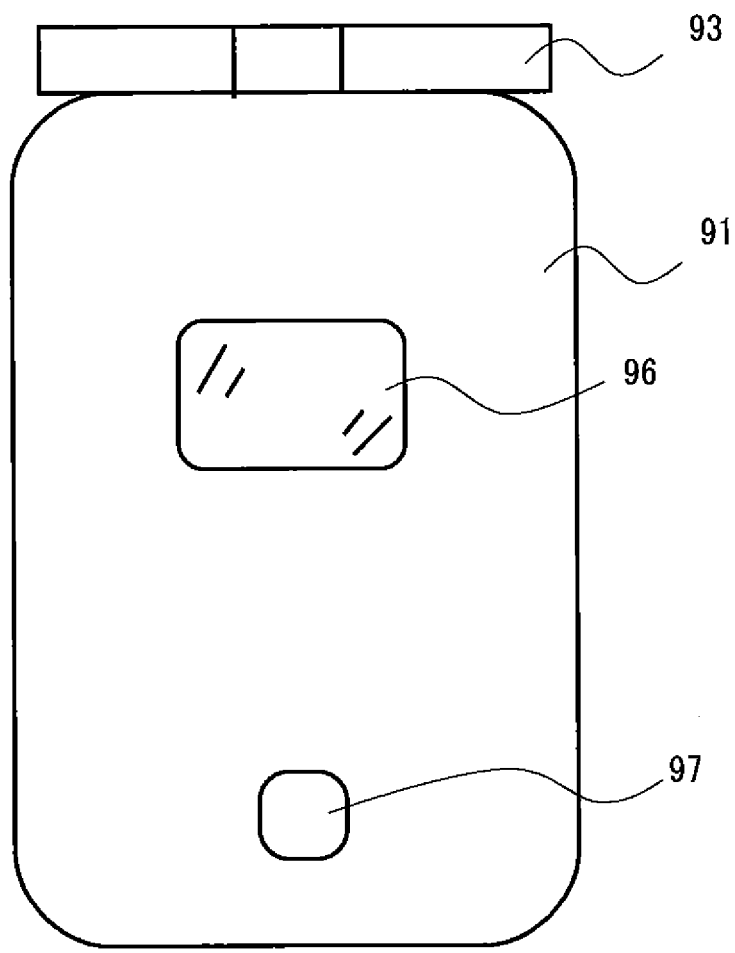
FIG. 14 is a schematic view showing a front structure of the cellular phone according to the first embodiment of the present invention.

First, a configuration of a cellular phone into which the camera module 150 is embedded is described by referring to FIGS. 13 and 14.

The camera module 150 is incorporated into a cellular phone (electronic apparatus) 90 shown in FIG. 13.

As shown in FIG. 13, the cellular phone 90 includes an upper body (first member) 91, a lower body (second member) 92, and a hinge 93. The upper body 91 and the lower body 92 are both flat-shaped members made of plastic, and they are joined via the hinge 93. The upper body 91 and the lower body 92 are configured so that they can be freely opened and closed by the hinge 93. When the upper body 91 and the lower body 92 are in the closed state, the cellular phone 90 is in the form of a flat-shaped member with the upper body 91 and the lower body 92 overlapping with each other.

The upper body 91 has a display unit 94 on its inner surface. On the display unit 94, information identifying a caller (name, telephone number etc.), an address book stored in a storage unit of the cellular phone 90 or the like is displayed. A liquid crystal display device is incorporated below the display unit 94.

The lower body 92 has a plurality of buttons 95 on its inner surface. A user of the cellular phone 90 operates the buttons 95 to open the address book, make a phone call or set the phone to a silent mode, for example, thereby operating the cellular phone 90 as intended. A user of the cellular phone 90 activates the camera module 150 in the cellular phone 90 by operating the buttons 95.

FIG. 14 shows the structure of the front face (top face) of the cellular phone 90. As shown in FIG. 14, a display region 96 is provided on the front face of the upper body 91. A LED in the display region 96 emits light to thereby let a user recognize incoming call. The above-described camera module 150 is incorporated into a region 97 of the upper body 91.

Figure 15:
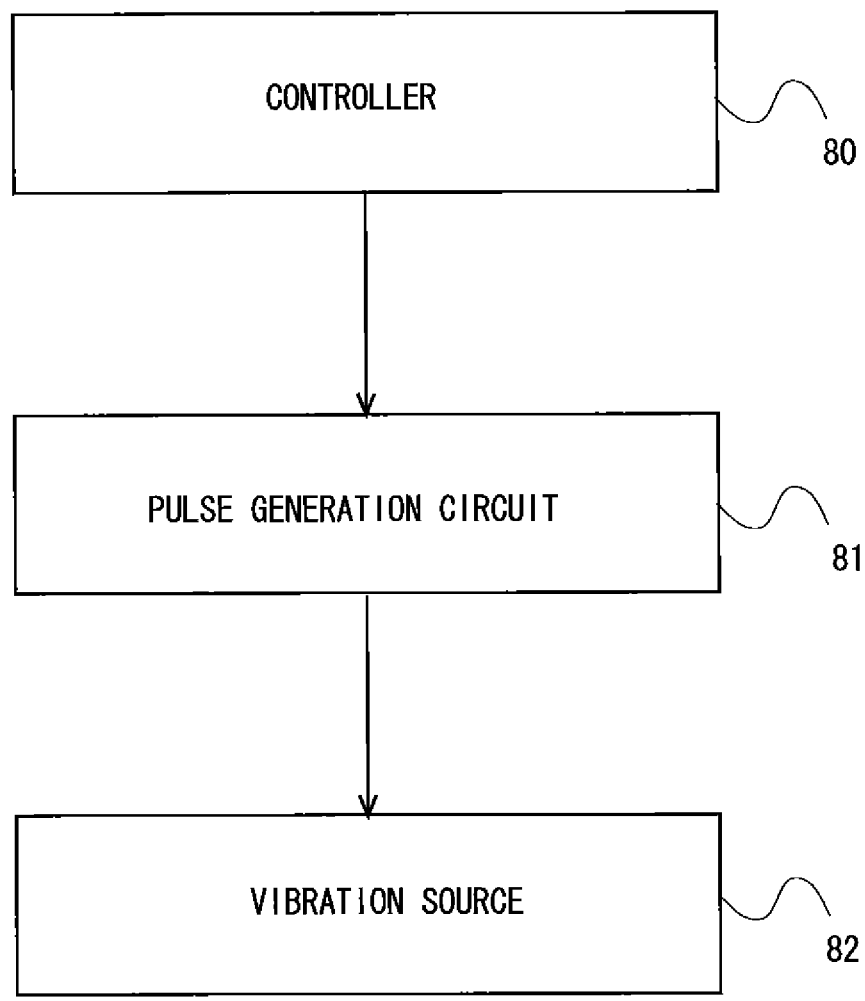
FIG. 15 is a block diagram showing a configuration of a drive unit for driving an actuator according to the first embodiment of the present invention.

Hereinafter, a system configuration for making the camera module 150 operate (a configuration of a drive unit of an actuator) is described with reference to FIG. 15. As shown in FIG. 15, output of a controller 80 is connected to a pulse generation circuit 81. Output of the pulse generation circuit 81 is connected to a vibration source 82. Note that the vibration source 82 corresponds to the above-described piezo element 42.

The controller 80 is implemented by execution of a program on a CPU incorporated into the cellular phone 90. The controller 80 activates the function of the camera module according to the operation of the cellular phone 90 by a user. The pulse generation circuit 81 generates a drive signal for driving the vibration source 82 according to a control signal from the controller 80. At this time, the autofocus function of the camera module is in the on-state, and the image sensor is in the imaging mode.

On the assumption of the above points, the operation of the camera module 150 (particularly, the operation to displace the lens holder 31) is described hereinafter with reference to FIGS. 16A and 16B. In this example, a sawtooth-shaped drive voltage is applied to the piezo element 42. Note that a method of generating the sawtooth-shaped drive voltage can be easily made through utilization of normal circuit technology. The drive voltage waveform is not limited to the sawtooth-shape, and another waveform may be employed.

Figure 16A:
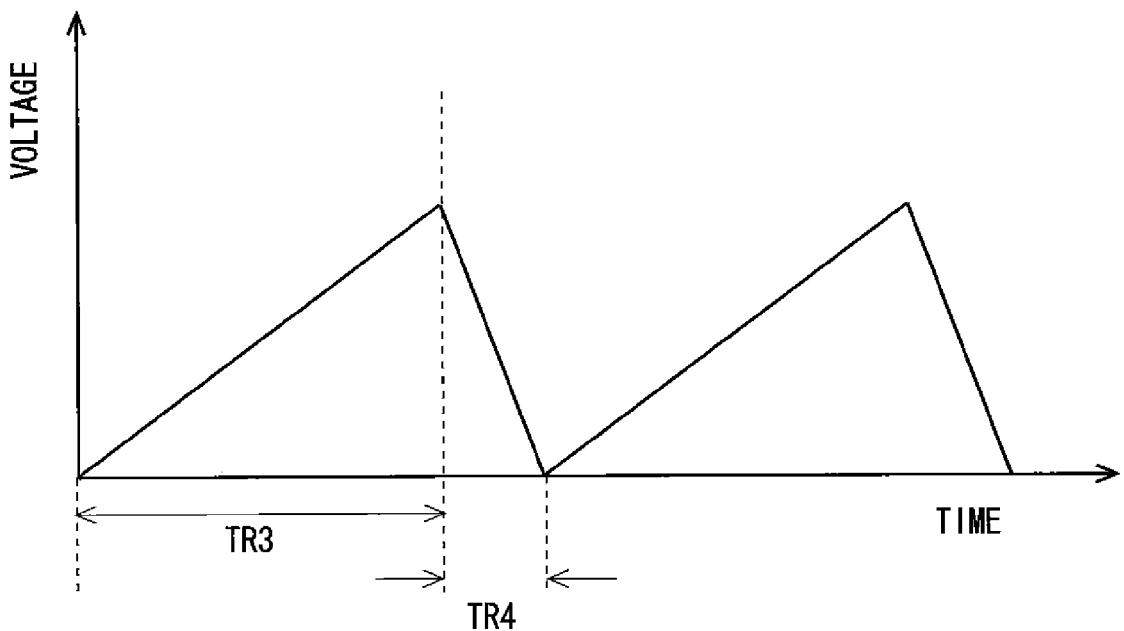
FIG. 16A is a schematic waveform chart showing a voltage waveform applied to a piezoelectric element according to the first embodiment of the present invention.

First, the case where the drive voltage shown in FIG. 16A is applied to the piezo element 42 is described. Note that, in the case shown in FIG. 16A, a falling period TR2 of the drive voltage waveform is shorter than a rising period TR1 of the same.

The lens holder 31 is not disposed during the rising period TR1 of the drive voltage. The lens holder 31 is disposed rearward during the falling period TR2 of the drive voltage waveform. By applying the drive voltage with the waveform in which the falling period TR2 is shorter than the rising period TR1 to the piezo element 42, the lens holder 31 can be disposed rearward (on the image sensor side).

Figure 16B:
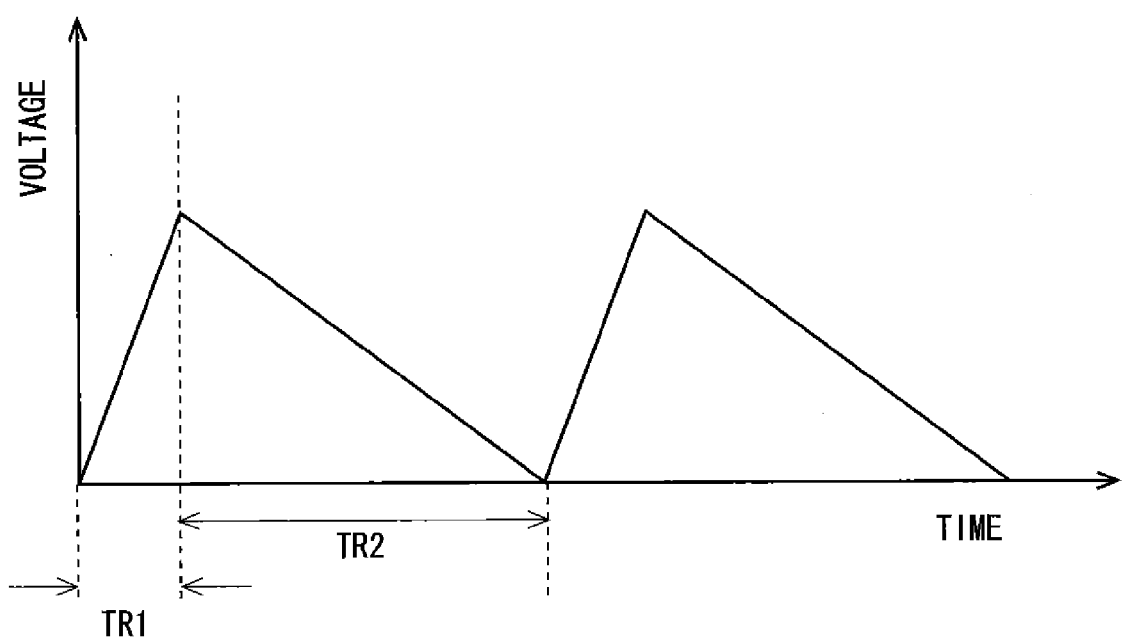
FIG. 16B is a schematic waveform chart showing a voltage waveform applied to a piezoelectric element according to the first embodiment of the present invention.

Next, the case where the drive voltage shown in FIG. 16B is applied to the piezo element 42 is described. Note that, in the case shown in FIG. 16B, a rising period TR3 of the drive voltage waveform is shorter than a falling period TR4 of the same.

The lens holder 31 is disposed forward during the rising period TR3 of the voltage waveform. The lens holder 31 is not disposed during the falling period TR4 of the voltage waveform. By applying the drive voltage with the waveform in which the rising period TR3 is shorter than the falling period TR4 to the piezo element 42, the lens holder 31 can be disposed forward (on the object side).

As is obvious from the above description, in this embodiment, the transmission shaft 44 is directly fixed to the lens holder 31. By fixing the shaft holding part 45 engaged with the transmission shaft 44 to the case 20, the lens unit 30 can be easily attached to the case 20. It is thus possible to facilitate the incorporation of the actuator into the camera module 150.

In other words, a structure in which the lens holder 31, the piezo element 42 and the transmission shaft 44 are displaced all together when viewed from the case 20 according to drive of the piezo element 42 is employed in this embodiment. It is thereby possible to facilitate the assembly of the camera module 150 compared to related art.

When the transmission shaft 44 is directly fixed to the lens holder 31, it is possible to position and fix them with high accuracy. It is thereby also possible to increase the accuracy of attaching the transmission shaft 44 to the lens holder 31 compared to related art.

Further, in this embodiment, in the state where the camera module 150 is assembled, the piezo element 42 is connected and hung from the transmission shaft 44, and it is in the state of being suspended in the upper space SP2. In other words, the piezo element 42 does not directly abut against the case 20. It is thereby possible to eliminate a structure for fixing the piezo element 42 and reduce the size of the camera module 150. Further, this eliminates a process for fixing the piezo element 42 (a bonding process to the casing, a spindle placement process to the transmission shaft etc.), which allows cost reduction of the lens unit 30 (the camera module 150).

Even when the piezo element 42 is made in the state of being suspended, the displacement of the lens holder 31 is not prevented. Generally, it is considered that, for efficient displacement of a movable object, it is necessary to mechanically fix the piezo element 42 that functions as a vibration source to another member (case etc.) and make the transmission shaft 44 free. By the study of the inventors of the present invention, it has been found that the function of the actuator is not hindered even when the piezo element 42 is assumed to be fixed in a space by the weight of the piezo element 42 itself. Therefore, the displacement of the lens holder 31 is not prevented even when the piezo element 42 is made in the state of being suspended.

The assembly of the lens unit 30 and the attachment process of the lens unit 30 to the case 20 are described hereinafter with reference to FIGS. 17A to 17D.

Figure 17A:
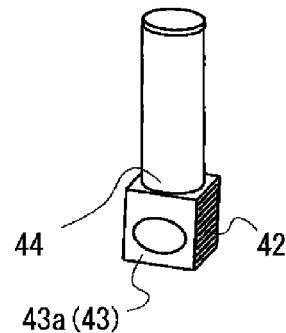
FIG. 17A is a schematic process drawing to illustrate a manufacturing method of a camera module according to the first embodiment of the present invention.

First, as shown in FIG. 17A, the transmission shaft 44 is placed on the upper surface of the piezo element 42, and they are fixed by bonding. Note that it is assumed that the electrodes 43 are formed in advance by vapor deposition or the like on the side surfaces of the piezo element 42.

Figure 17B:
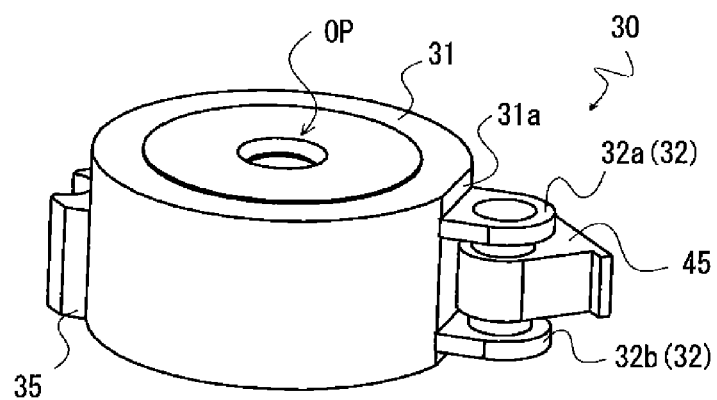
FIG. 17B is a schematic process drawing to illustrate a manufacturing method of a camera module according to the first embodiment of the present invention.

Next, as shown in FIG. 17B, the shaft holding part 45 is disposed between the support plates 32a and 32b of the lens holder 31.

Figure 17C:
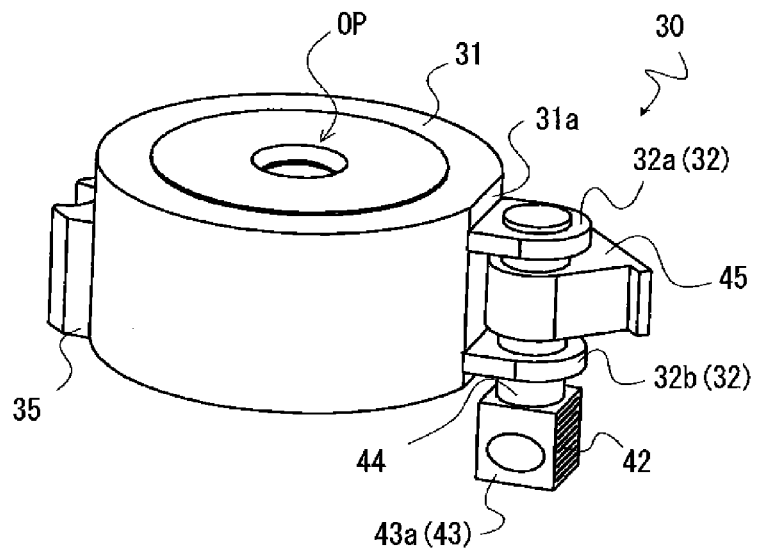
FIG. 17C is a schematic process drawing to illustrate a manufacturing method of a camera module according to the first embodiment of the present invention.

Then, as shown in FIG. 17C, the transmission shaft 44 with the piezo element 42 fastened at the lower end is inserted into the hole of the support plate 32b, the hole of the shaft holding part 45 and the hole of the support plate 32a. The transmission shaft 44 is thereby fastened to the support plates 32a and 32b. The shaft holding part 45 is engaged with the transmission shaft 44 in a slidable manner.

Figure 17D:
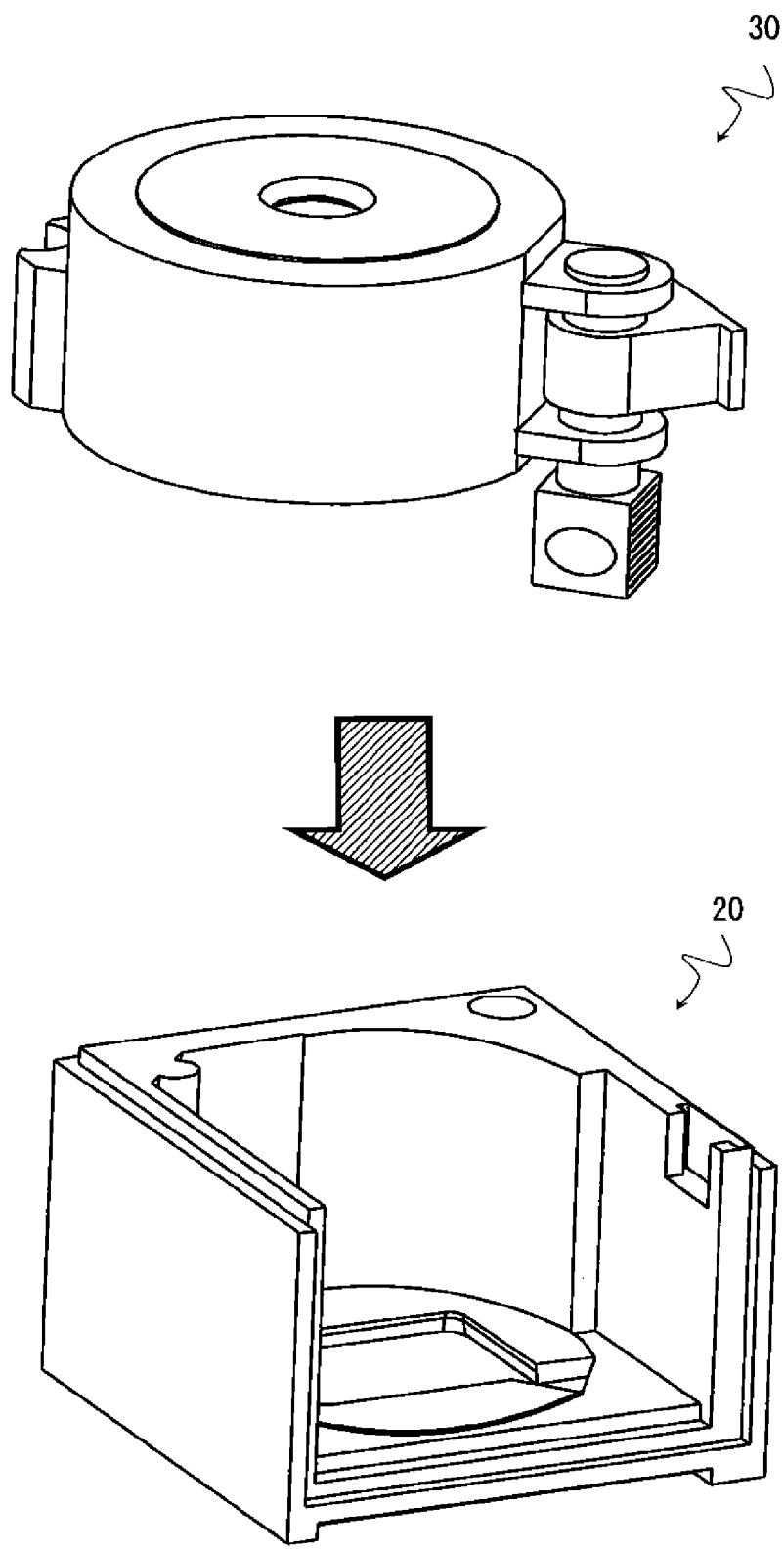
FIG. 17D is a schematic process drawing to illustrate a manufacturing method of a camera module according to the first embodiment of the present invention.

After that, as shown in FIG. 17D, the lens unit 30 is fixed to the case 20. The main part of the camera module 150 is thereby assembled.

It should be noted that a method of assembling the camera module 150 as a whole is arbitrary. For example, the connector 11 and the image sensor 12 are fixed in advance onto the flexible wiring board 10. Next, the case 20 is fixed onto the flexible wiring board 10. Then, the lens unit 30 assembled as above is fixed to the case 20. After that, the cover 50 is attached to the case 20. Then, the cover 50 is fixed to the case 20 by the screw 55 or the like.

Figure 18:
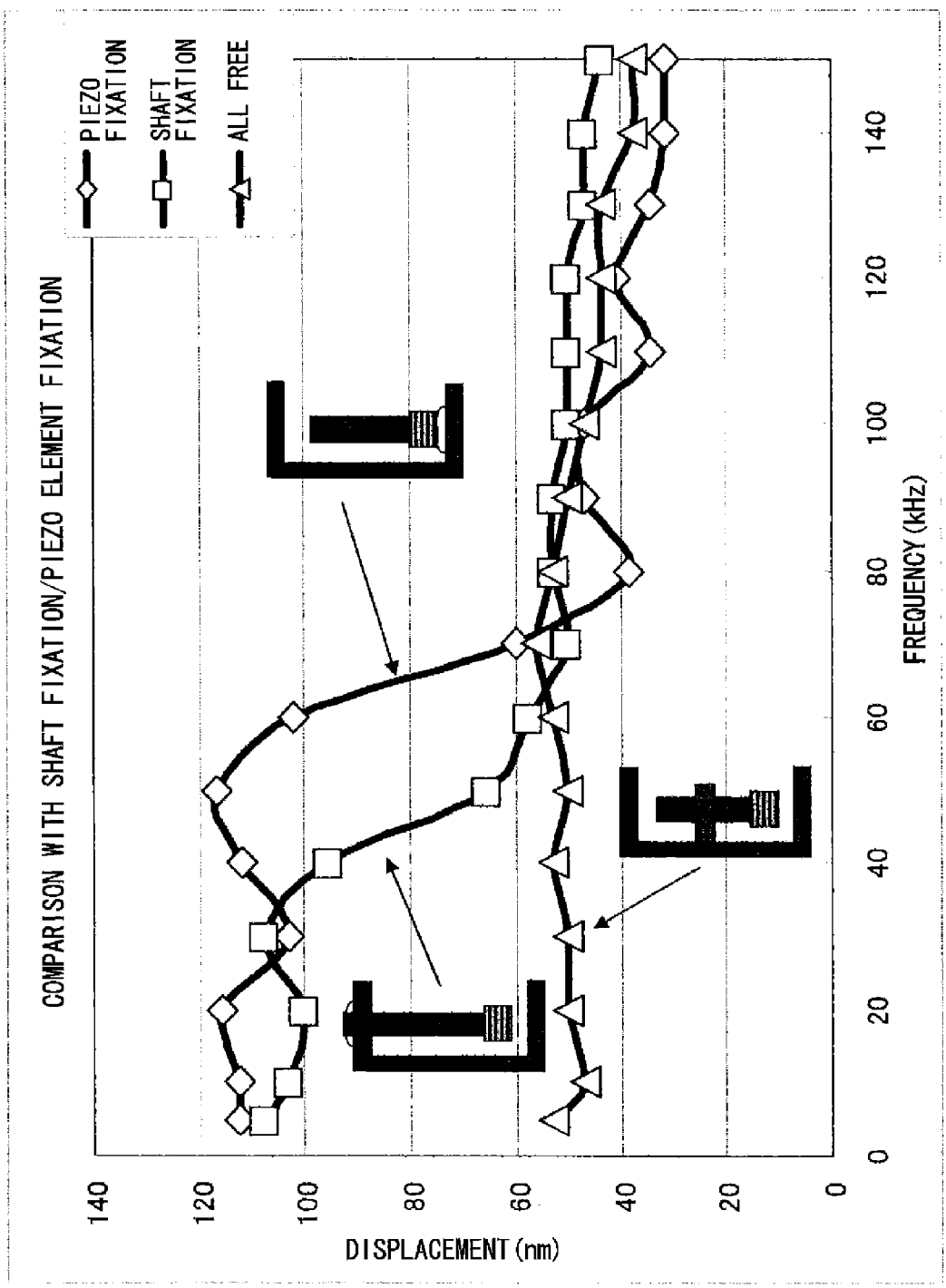
FIG. 18 is a schematic graph to illustrate characteristics of a drive device according to the first embodiment of the present invention.

Finally, FIG. 18 shows a relationship between a drive frequency of the piezo element 42 and a displacement for each of drive devices having different structures. In FIG. 18, the case of this embodiment is shown as (1) the case of all-free, a structure example in which the piezo element is fastened to the stationary member is shown as (2) the case of piezo fixation, and a structure example in which one end of the drive shaft with the piezo element fixed at the other end is fastened to the stationary member is shown as (3) the case of shaft fixation.

The horizontal axis indicates a drive frequency for the piezo element, and the vertical axis indicates a displacement of the end of the piezo element 42 or the end of the transmission shaft 44 with respect to the drive frequency.

According to it, in the case of piezo fixation, the displacement is unstable due to resonance in the wide range of 0 to 70 Hz. In the case of shaft fixation, although slight improvement is seen, the displacement is unstable due to resonance in the range of 0 to 50 Hz. In the case of all-free, the displacement is constant at all frequencies, and remarkably stable output is obtained. This is because, in the case of all-free, a resonance frequency that causes a problem shifts to a high frequency band which is not shown in the graph.

In this embodiment, both of the piezo element 42 and the transmission shaft 44 are not directly fixed to the case 20 as the stationary member. Therefore, a drive frequency for the piezo element 42 can be appropriately set in consideration only of specific resonance derived from the piezo element 42 and the transmission shaft 44, without consideration of resonance of the case 20. This enables a manufacturer of drive parts to set an appropriate drive frequency regardless of the incorporation state of the drive device into a main body. By setting an appropriate drive frequency, it is possible to effectively suppress the degradation of the yield of an end product.

Further, a relationship between the transmission shaft according to the embodiment of the resonance frequency described above is described in detail. The transmission shaft 44 has a long cylindrical body and transmits the vibration produced by the piezo element 42 to the lens holder 31. The transmission shaft 44 is preferably lightweight and highly rigid. By reducing the weight of the transmission shaft 44, the resonance frequency can be set to a high frequency band. This enables a switching signal used for drive of the piezo element 42 to be set to a higher frequency. The same results can be obtained by increasing the rigidity of the transmission shaft 44. Note that the weight reduction of the transmission shaft 44 also enables faster displacement of the transmission shaft 44. The transmission shaft 44 is made of material with a relative density of 2.1 or less. Preferably, the transmission shaft 44 is made of material with a relative density of 2.1 or less and an elastic modulus of 20 GPa or more. More preferably, the transmission shaft 44 is, made of material with a relative density of 2.1 or less and an elastic modulus of 30 GPa or more. Explicitly describing specific material, the transmission shaft 44 is made of glass-like carbon, glass-like carbon complex at least containing graphite, fiber-reinforced resin containing carbon, or epoxy resin composite containing glass or carbon. This allows the resonance frequency to shift to a high frequency range, enhances operation stability and makes high-speed drive possible. Note that it is sufficient to shift the resonance frequency to 220 KHz or higher, and it is 290 GHz in this embodiment.

Second Embodiment

A second embodiment of the present invention is described hereinafter with reference to FIGS. 19A and 19B. The camera module 150 shown in FIG. 19A corresponds to the camera module according to the first embodiment, and it is different from the first embodiment in that the piezo element 42 is placed on the object side. The camera module 150 shown in FIG. 19B corresponds to the camera module according to this embodiment.

Figure 19A:
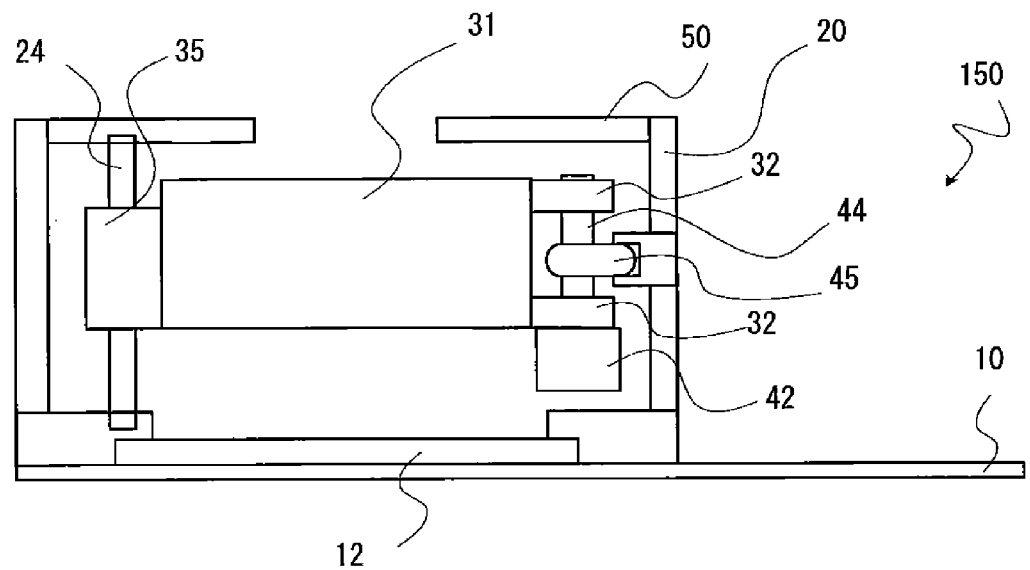
FIG. 19A is a schematic view showing a structure of a camera module according to a second embodiment of the present invention.
Figure 19B:
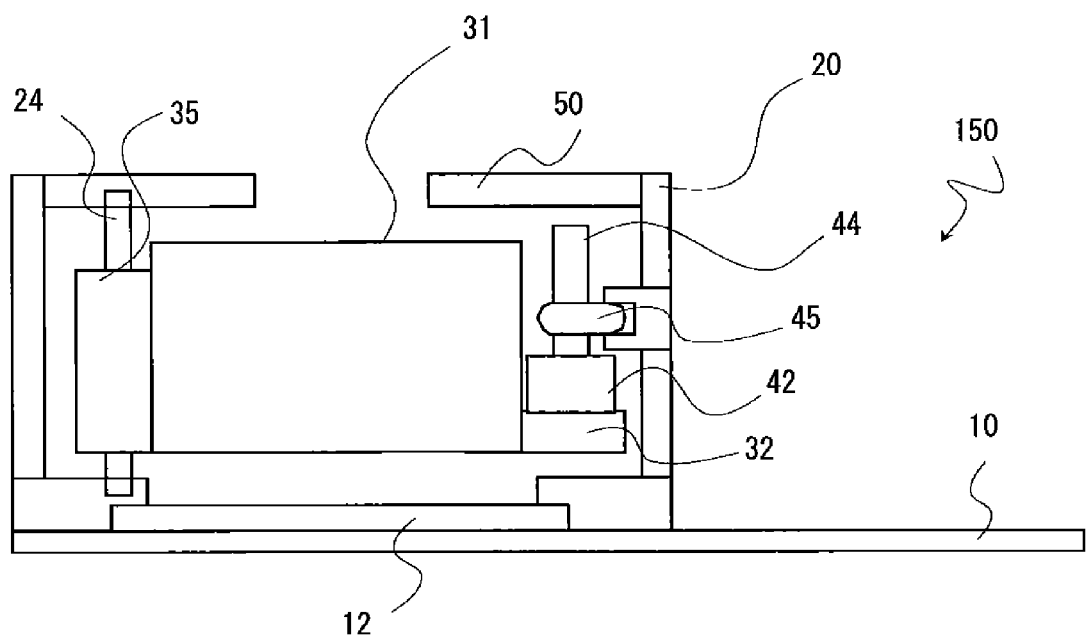
FIG. 19B is a schematic view showing a structure of the camera module according to the second embodiment of the present invention.

As is obvious from comparison between FIG. 19A and FIG. 19B, the piezo element 42 is fastened to the lens holder 31 in this embodiment. Specifically, the piezo element 42 is fastened onto the support plate 32 of the lens holder 31. In such a case also, the same advantageous effect as the first embodiment can be obtained. It is only necessary to fix the piezo element 42 onto the support plate 32, so that the camera module 150 can be easily assembled.

Third Embodiment

A third embodiment of the present invention is described hereinafter with reference to FIGS. 20 to 21B. This embodiment is an alternative example of the first embodiment, and an IR-cut filter plate 55 is disposed at an opening OP2 of the partition 22. By blocking invisible light rays such as near infrared rays and infrared rays, it is possible to effectively suppress a noise component from being superposed on an image taken by the image sensor 12. Further, the shaft holding part 45 holds the transmission shaft 44 with utilization of an urging force of a spring. In such a case also, the same advantageous effect as the first embodiment can be obtained.

Figure 20:
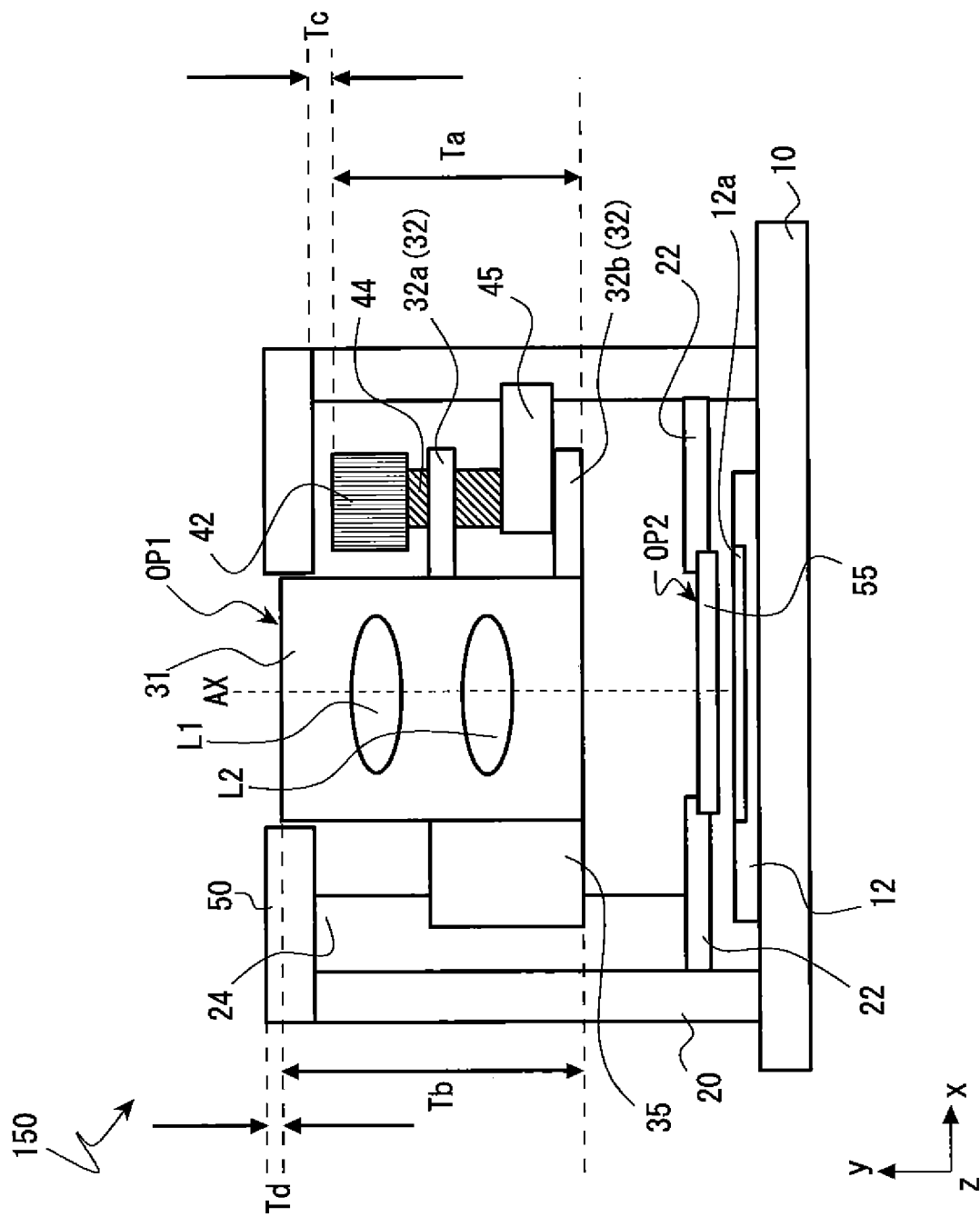
FIG. 20 is a schematic view showing a structure of a camera module according to a third embodiment of the present invention.

As shown in FIG. 20, in this embodiment, a width Ta of a coupled body of the piezo element 42 and the transmission shaft 44 along the y-axis is equal to or less than a width Tb of the lens holder 31 along the y-axis. In other words, when Ta is the width of the coupled body made up of the piezo element and the transmission shaft along the y-axis and Tb is the width of the lens holder along the y-axis, Ta≤Tb is satisfied. Further, in the state where the lens holder 31 shown in FIG. 6 is located on the most object side, an interval Tc between the lower surface of the cover 50 and the upper surface of the piezo element 42 is equal to or less than an interval Td between the upper surface of the cover 50 and the upper surface of the lens holder 31. In other words, when Tc is the interval between the lower surface of the cover and the upper surface of the piezo element 42 and Td is the interval between the upper surface of the cover and the upper surface of the lens holder 31, Tc≤Td is satisfied.

With such setting, the camera module 150 can be effectively reduced in thickness. Note that the position of the lens holder 31 on the object side is restricted by abutting of the shaft holding member 45 against the flat plate portion 32a. Further, the position of the lens holder 31 on the image sensor side is restricted by abutting of the shaft holding member 45 against the flat plate portion 32b. By appropriately setting the position of the shaft holding member 45, it can be set so as not to come into contact with the image sensor 12 with the image sensor 12 even without the partition 22. Further, by placing the upper end and the lower end of the flat plate portion 32, the transmission shaft 44 and the piezo element 42 coupled to or integrated with the lens unit 31 between the upper end and the lower end of the lens unit 31, in other words, by disposing the flat plate portion 32, the transmission shaft 44 and the piezo element 42 within the range of the length of the lens unit 31 in the optical axis direction of the lens, it is possible to reduce the height of the camera module and enable downsizing.

Note that, when the opening OP1 for allowing insertion of the lens holder 31 is not created in the cover 50, the above-described interval Td corresponds to the interval between the lower surface of the cover 50 and the upper surface of the lens holder 31.

Figure 21A:
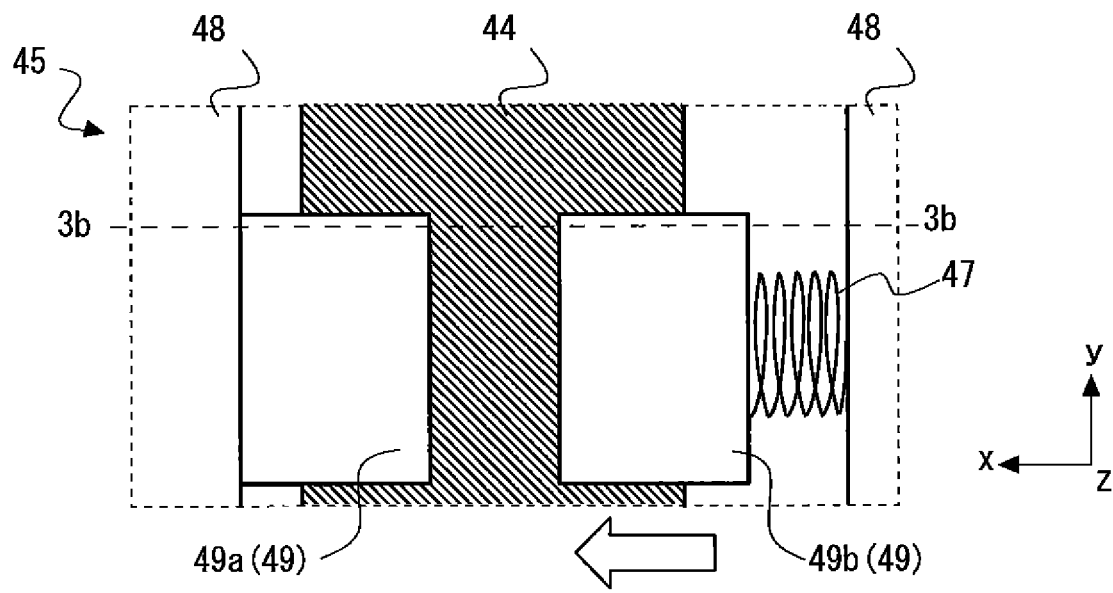
FIG. 21A is a schematic view showing a structure of a shaft holding part of the camera module according to the third embodiment of the present invention.
Figure 21B:
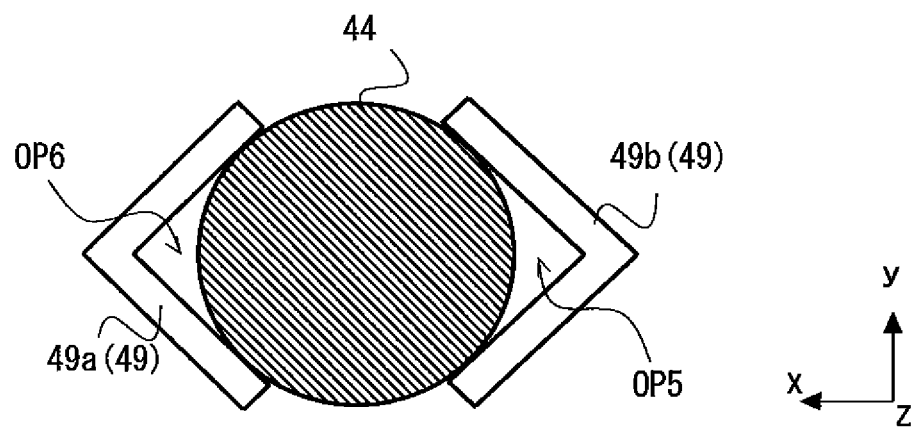
FIG. 21B is a schematic view showing a structure of a shaft holding part of the camera module according to the third embodiment of the present invention.

FIGS. 21A and 21B are schematic views showing the manner of holding the transmission shaft 44 by the shaft holding part 45. The shaft holding part 45 has a shaft receiving portion for receiving the transmission shaft 44. The shaft holding part 45 holds the transmission shaft 44 by urging, using an urging mechanism described later, the transmission shaft 44 that is received in the shaft receiving portion.

As shown in FIG. 21A, the shaft holding part 45 has press plates (pressing members) 49 (49a, 49b) and a spring (urging member, elastic member) 47 inside an opening of a flat plate part 48. By holding the transmission shaft 44 tight between the press plate 49a and the press plate 49b by an urging force of the spring 47, the transmission shaft 44 and the shaft holding part 45 are in friction engagement with each other. Note that a specific structure of the spring 47 is arbitrary, and another elastic member such as a leaf spring or a rubber may be used.

As shown in FIG. 21B, the press plate 49a is a member having a dog-leg shape when viewed from above. The press plate 49a abuts against the transmission shaft 44 at two points. The press plate 49a is preferably made of metal. By adopting this, it becomes possible to effectively suppress a foreign particle from being produced from the press plate 49a due to a friction between the transmission shaft 44 and the press plate 49a. The press plate 49b has the similar structure to the press plate 49a. A space OP6 is present between the press plate 49a and the transmission shaft 44. A space OP5 is present between the press plate 49b and the transmission shaft 44. Note that the structure of the shaft holding part and the idea regarding downsizing of the camera module described in this embodiment are applicable to the first embodiment in which the piezo element is placed on the image side as a matter of course.

The technological range of the present invention is not limited to the above-described embodiments. Each of the above-described embodiments can be combined with each other as desirable. A specific application of the lens unit 30 is arbitrary. A specific application of the camera module 150 is arbitrary. A specific assembly method of the lens unit 30 and the camera module 150 is arbitrary. Specific material or the like of members included in the lens unit 30 and the camera module 150 are selected as appropriate. The movable object is not limited to the lens holder, and it may be another component such as a shutter. Thus, the movable object is arbitrary, and it is not limited to an optical component such as a lens and may be another kind of component. A specific application of the drive device is arbitrary, and it may be incorporated into another device different form the camera module.

INDUSTRIAL APPLICABILITY

The present invention may be applied to a drive device which is incorporated into a main device, for example.

REFERENCE SIGNS LIST

150 CAMERA MODULE
10 FLEXIBLE WIRING BOARD
11 CONNECTOR
12 IMAGE SENSOR
20 CASE
22 PARTITION
24 RAIL
25 RECEIVING PORTION
26 CHANNEL
27 PROTRUSION
29 PARTITION
30 LENS UNIT
31 LENS HOLDER
31a FLAT SURFACE
32 SUPPORT PLATE
33 TRANSMISSION SHAFT
35 RAIL RECEIVING PART
42 PIEZO ELEMENT
43 ELECTRODE
44 TRANSMISSION SHAFT
45 SHAFT HOLDING PART
46 FLANGE
50 COVER
51 TOP PLATE
52 SIDE PLATE
53 THIN PART
55 SCREW
80 CONTROLLER
81 PULSE GENERATION CIRCUIT
82 VIBRATION SOURCE
L1-L4 LENS
OH SCREW HOLE
OP1-OP3 OPENING
SP1 LOWER SPACE
SP2 UPPER SPACE

The invention claimed is:

1. A drive device comprising:
a piezoelectric element that expands and contracts according to a drive voltage;
a drive shaft that is attached to the piezoelectric element and that receives vibration produced by the piezoelectric element;
a stationary member that holds the drive shaft in a state where the drive shaft is slidable along a longitudinal direction of the drive shaft; and
a movable object that is fixed to the draft shaft, wherein:
the movable object moves, together with the piezoelectric element and the drive shaft, relative to the stationary member according to drive of the piezoelectric element, and
the entire piezoelectric element and the drive shaft move relative to the stationary member and in a moving direction of the movable object in synchronization with the movable object according to drive of the piezoelectric element.

2. The drive device according to claim 1, wherein the piezoelectric element and the drive shaft do not project more than the movable object in the moving direction side of the movable object.

3. The drive device according to claim 1, wherein the stationary member includes:
a shaft holding part that holds the drive shaft; and
a main body part to which the shaft holding part is fixed.

4. The drive device according to claim 3, wherein the shaft holding part is detachable from the main body part.

5. The drive device according to claim 3, wherein the shaft holding part and the main body part are coupled to each other by structural engagement.

6. The drive device according to claim 3, wherein the main body part is a surrounding member that surrounds the movable object.

7. The drive device according to claim 3, wherein the shaft holding part and the main body part are formed integrally.

8. The drive device according to claim 1, wherein the movable object has at least one support part that fixedly supports the drive shaft.

9. The drive device according to claim 1, wherein the movable object has a plurality of support parts that fixedly support the drive shaft.

10. The drive device according to claim 6, wherein a shaft holding part of the stationary member is placed between the plurality of support parts.

11. The drive device according to claim 10, wherein a moving range of the movable object is restricted by abutting of at least one of the plurality of support parts against the shaft holding part.

12. The drive device according to claim 1, wherein the drive shaft is made of material with a relative density of 2.1 or less.

13. The drive device according to claim 1, wherein the drive shaft is made of material with a relative density of 2.1 or less and an elastic modulus of 20 GPa or more.

14. The drive device according to claim 1, wherein the drive shaft is made of at least one material selected from the group consisting of glass-like carbon, glass-like carbon complex at least containing graphite, fiber-reinforced resin containing carbon, and epoxy resin composite containing glass or carbon.

15. The drive device according to claim 1, wherein the piezoelectric element and the drive shaft are coupled to each other.

16. The drive device according to claim 1, wherein the movable object is a lens holder that holds a lens.

17. An image acquisition device comprising:
the drive device according to claim 16; and
an image pickup unit that captures an image input through the lens.

18. An electronic apparatus comprising the image acquisition device according to claim 17.

19. A drive device comprising:
a stationary member;
a piezoelectric element;
a drive shaft that is attached to the piezoelectric element and that receives vibration produced by the piezoelectric element; and
a movable object that is fixed to at least one of the piezoelectric element and the drive shaft and that moves according to drive of the piezoelectric element, wherein:
the drive shaft is engaged with the stationary member in a state of being slidable along a longitudinal direction of the drive shaft,
the entire piezoelectric element and the drive shaft move relative to the stationary member and according to drive of the piezoelectric element, and
the movable object moves, together with the piezoelectric element and the drive shaft, relative to the stationary member.

20. A drive device comprising:
a piezoelectric element that expands and contracts according to a drive voltage;
a drive shaft that is attached to the piezoelectric element and that receives vibration produced by the piezoelectric element;
a stationary member that comprises a shaft holding part that holds the drive shaft such that the drive shaft is slidable along a longitudinal direction of the drive shaft; and
a movable object that is fixed to the drive shaft, wherein:
the movable objected moves, together with the piezoelectric element and the drive shaft, relative to the stationary member according to drive of the piezoelectric element,
the movable object comprises at least two support parts that fixedly support the drive shaft, the shaft holding part being arranged between the two support parts, and
the entire piezoelectric element and the drive shaft move relative to the stationary member and in a moving direction of the movable object in synchronization with the movable object according to drive of the piezoelectric element.

* * * * *